United States Patent
Heckler et al.

(10) Patent No.: US 7,920,093 B2
(45) Date of Patent: Apr. 5, 2011

(54) METHODS FOR IMPROVING COMPUTATIONAL EFFICIENCY IN A GLOBAL POSITIONING SATELLITE RECEIVER

(75) Inventors: Gregory W. Heckler, Greenbelt, MD (US); James L. Garrison, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 169 days.

(21) Appl. No.: 11/904,600

(22) Filed: Sep. 27, 2007

(65) Prior Publication Data

US 2008/0143598 A1    Jun. 19, 2008

Related U.S. Application Data

(60) Provisional application No. 60/848,796, filed on Sep. 27, 2006.

(51) Int. Cl.
*G01S 19/37* (2010.01)
(52) U.S. Cl. .................................................. 342/357.77
(58) Field of Classification Search ............. 342/357.01–357.17, 357.2–357.78; 375/150
See application file for complete search history.

(56) References Cited

U.S. PATENT DOCUMENTS

| | | | |
|---|---|---|---|
| 5,781,156 A | 7/1998 | Krasner | |
| 6,487,499 B1 | 11/2002 | Fuchs et al. | |
| 6,567,042 B2 | 5/2003 | Lin et al. | |
| 6,587,789 B2 | 7/2003 | van Diggelen | |
| 6,720,917 B2 | 4/2004 | Lin et al. | |
| 6,829,535 B2 | 12/2004 | van Diggelen | |
| 6,952,460 B1 * | 10/2005 | Van Wechel et al. | 375/350 |
| 2006/0022868 A1 * | 2/2006 | Awata | 342/357.12 |

* cited by examiner

*Primary Examiner* — Thomas H Tarcza
*Assistant Examiner* — Nga X Nguyen
(74) *Attorney, Agent, or Firm* — Maginot, Moore & Beck

(57) ABSTRACT

A method reduces consumption of computational resources in a satellite signal receiver. The method includes segmenting a sample of a received global positioning base band vector, segmenting a sample of a replica code/acquisition signal into segments corresponding in length to the segments of the base band vector, circularly correlating segments of the base band vector to zero padded segments of the code/acquisition signal to form a time domain correlation vector, inserting a portion of the time domain correlation vector in a matrix, continuing to correlate circularly the segments of the received signal sample with zero padded segments of the code signal sample until all of the segments in received signal sample have been circularly correlated, dividing rows in the matrix into blocks that are equal to a smallest increment corresponding to a bit edge, sorting the blocks from the divided rows into zero padded blocks, transforming the zero padded blocks into frequency domain columns, summing the frequency domain columns in different combinations to form a plurality of coherent integration matrices for testing possible bit edge locations and bit values.

12 Claims, 16 Drawing Sheets

METHODS FOR IMPROVING COMPUTATIONAL EFFICIENCY IN A GLOBAL POSITIONING SATELLITE RECEIVER

CROSS-REFERENCES

This application claims priority to provisional patent application having Ser. No. 60/848,796, which was filed on Sep. 27, 2006 and to co-pending U.S. patent application Ser. No. 11/212,125, which was filed on Aug. 25, 2005 and is entitled "System and Method For Acquiring Weak Signals In A Global Positioning Satellite System," and which claims priority from U.S. patent application Ser. No. 11/212,021, which was filed on Aug. 24, 2005 and is entitled "System and Method For Acquiring Weak Signals In A Global Positioning Satellite System," which claims priority from provisional patent application Ser. No. 60/604,333, which was filed on Aug. 24, 2004. The disclosures of these applications are hereby expressly incorporated by reference into this application in their entireties.

TECHNICAL FIELD

This disclosure relates to global positioning satellite receivers, and more particularly, to global positioning satellite receivers that detect weak strength signals from the positioning satellites.

BACKGROUND

The Global Positioning System (GPS) is a satellite-based location system. In the GPS, several satellites orbiting the earth provide signal codes that are detected by receivers. The receivers use the codes to lock onto the satellite signal. The receiver or user then measures the time of arrival of the satellite signal against an internal clock, which indicates a delay from the satellite. Such delay is determined for at least four different satellites. Those delays translate to distances. Because the distances to each of four satellites are known, and because the position of the satellites are known, the X, Y, and Z coordinates of the user may be calculated, as well as the user's clock error. This method is known as pseudo-ranging, and systems other than GPS use similar technology.

The delay between transmission of a satellite and reception by a receiver is obtained by causing the receiver to latch onto a repetitive code of a particular satellite. To this end, the receiver generates the code of each satellite in a repetitive pattern and then, for a particular satellite, tries to line up the internally generated code with the received code from the satellite. To "line up" the internally generated code, the internally generated code sequence must be delayed by some amount. This delay provides the time measurement from the internal clock, $Code_{sat1}(t)=Code_{rec}(t+\delta_1)$, where $\delta_1$ is a delay value. By aligning internal codes of other satellites with corresponding internal codes, other delay values may be obtained. Thus, for three other satellites, delay values $\delta_2$, $\delta_3$, and $\delta_4$ may be generated. Then, by obtaining the position information for those satellites $(x_j, y_j, z_j)$ for $j=\{1, 2, 3, 4\}$, a system of equations may be set up to determine the location of the receiving device.

The system of equations is derived from the equation for the distance between a satellite and the receiver in terms of delay, which may be expressed as: Distance=$\delta_j$*C (speed of light). However, the measured delay does not provide an absolute delay value because the clock in the receiver is not necessarily synchronized to the satellites, which are synchronized together. So the actual distance between a satellite n and the receiver is the measured delay $\delta_j$, plus a receiver clock offset $T_{off}$, times the speed of light. Thus, the following system of equations can be set up:

$$(\delta_1+T_{off})*C=[(x_1-x_r)^2+(y_1-y_r)^2+(z_1-z_r)^2]^{1/2}$$

$$(\delta_2+T_{off})*C=[(x_2-x_r)^2+(y_2-y_r)^2+(z_2-z_r)^2]^{1/2}$$

$$(\delta_3+T_{off})*C=[(x_3-x_r)^2+(y_3-y_r)^2+(z_3-z_r)^2]^{1/2}$$

$$(\delta_4+T_{off})*C=[(x_4-x_r)^2+(y_4-y_r)^2+(z_4-z_r)^2]^{1/2}$$

The above four equations amount to four equations with four unknown variables, which may then be solved for the receiver position $x_r$, $y_r$, $z_r$, as well as the offset of the receiver clock $T_{off}$. Because the speed of light is 286,000 miles per second, even a small discrepancy in a delay measurement $\delta_j$ that is used to compute the distance from the distance equation already noted, can result in significant inaccuracy.

The processing capability of wireless devices is increasing and the incorporation of GPS positioning applications in such devices is desirable. Such applications may work well in these devices in environments where a strong signal may be received from a satellite. These devices, however, are typically used in urban environments. In an urban environment, the user may travel under a bridge, through a tunnel, or through what is referred to in the literature as an "urban canyon," in which buildings block the signals or reflect them. Consequently, the wireless device may need to acquire and track weak signals from the positioning satellites.

Accurate alignment of the internal and external codes to get a precise delay number in a weak signal environment may be difficult. To facilitate accurate alignment, the acquisition code sequence, known in the art at the C/A code, is 1023 bits and repeated periodically every 1 millisecond. By superimposing the internal code over the received code for multiple instances of the code, a correlation technique may be used to filter out noise present in the signal. As the number of 1 millisecond periods used for correlation increases, the ability of the receiver to acquire weaker signals increases.

The practical number of subsequent sequences of the C/A code that may be used is hindered, however, by the fact that the C/A code is in fact superimposed over another signal, referred to as the data signal, which has a pulse width of 20 milliseconds. The data signal contains the time and location information for the satellite, among other things. Before the signal is acquired, the data signal is unknown to the receiver, and appears as a pseudorandom signal. Because the receiver does not know the data signal, the receiver does not know the effects of the data signal on the C/A sequences. Changes in the data signal from a +1 to a −1 value completely change the appearance of the C/A sequences. Moreover, although there are 20 repetitions of the C/A sequence for every data signal value, the receiver does not have a priori knowledge of when the transitions of the data signal occur. Accordingly, the imposition of the data signal makes the use of multiple C/A sequences to achieve acquisition of the C/A code for weak GPS signals difficult.

One way of improving the sensitivity to weak signals of a GPS receiver is to increase the pre-detection integration time (PIT), which reduces the noise bandwidth. The improvement available through this technique is limited because the location of the data bits and bit edges in the signal is unknown. For a GPS C/A code, the upper bound on the PIT is one code length (1 ms), if the data bits and the bit edge positions are unknown. The upper bound is one data length (20 ms), if only the data bits are unknown. Increasing the PIT, however, requires an increased number of Doppler bins, a signal processing structure used to estimate the Doppler shift in a signal. The increase in the number of these structures increases the processing and memory requirements for the coherent integrations.

Conventional weak signal acquisition systems implemented in hardware search satellites at each possible code delay and Doppler shift in a sequential manner. As a result, the processing time and memory requirements increase as the size of the search space increases. One approach to reducing the computational demands for coherent integrations is to use circular correlation techniques implemented in software. Circular correlation uses Fast Fourier Transform (FFT) methods to calculate the coherent integration at all possible code delays for each possible Doppler shift. Some systems that use other approaches than circular correlation are able to eliminate the use of Doppler bins, but they suffer from low sensitivity. Other systems use circular correlation with increased PIT, but they do not address unknown bit edge positions and data bits.

Another approach to reducing the demand for computational resources is to use a Double Block Zero Padding (DBZP) approach. This approach calculates correlations at all possible code delays and Doppler shifts in the same processing steps. The maximum integration length that can be used with DBZP is limited, however. The limitation arises from the use of only one replica code that is not compensated by the effect of the Doppler shift on the code duration.

These known techniques for acquiring the C/A code for weak signals require long coherent and incoherent integrations. These acquisition techniques also require more processing capability or memory than is typically available in many wireless devices. In order to improve the ability of wireless devices to incorporate GPS applications, weak signal acquisition methods are needed that do not require more computational resources than those available in wireless devices.

The discussion above focuses on the detection and acquisition of weak signals in the presence of background noise. That is, the data signal has been attenuated to a level that makes its detection difficult even when no interfering signal is present. A different problem arises when the GPS receiver attempts to detect and acquire a signal in the presence of strong interfering signals. As noted above, the GPS signal includes a C/A code for identification. Different C/A codes have non-zero cross-correlation. The cross-correlation between the local replica code and the code of a received interfering signal causes the interfering signal to appear with a reduced power from its original received power. This causes the interfering signal to appear at many code delays, which affects the processing for detecting and acquiring the GPS signal in the presence of a strong interfering signal.

In response to the above noted needs, a method of signal acquisition has been developed that is useful with weak signals. This method is disclosed in co-pending U.S. patent application Ser. No. 11/212,125, which was filed on Aug. 25, 2005 and is entitled "System and Method For Acquiring Weak Signals In A Global Positioning Satellite System." The method set forth in that application uses circular correlation and double block zero padding to perform the coherent and incoherent integrations required for signal acquisition. Those methods, however, remain relatively resource intensive. Computational efficiencies in the performance of the method disclosed in that application would increase the range of devices in which the method may be used.

SUMMARY

A method reduces consumption of computational resources in a satellite signal receiver. The method includes segmenting a sample of a received global positioning base band vector, segmenting a sample of a replica code/acquisition signal into segments corresponding in length to the segments of the base band vector, circularly correlating segments of the base band vector to zero padded segments of the code/acquisition signal to form a time domain correlation vector, inserting a portion of the time domain correlation vector in a matrix, continuing to correlate circularly the segments of the received signal sample with zero padded segments of the code signal sample until all of the segments in received signal sample have been circularly correlated, dividing rows in the matrix into blocks that are equal to a smallest increment corresponding to a bit edge, sorting the blocks from the divided rows into zero padded blocks, transforming the zero padded blocks into frequency domain columns, summing the frequency domain columns in different combinations to form a plurality of coherent integration matrices for testing possible bit edge locations and bit values.

DETAILED DESCRIPTION

Figure 1:
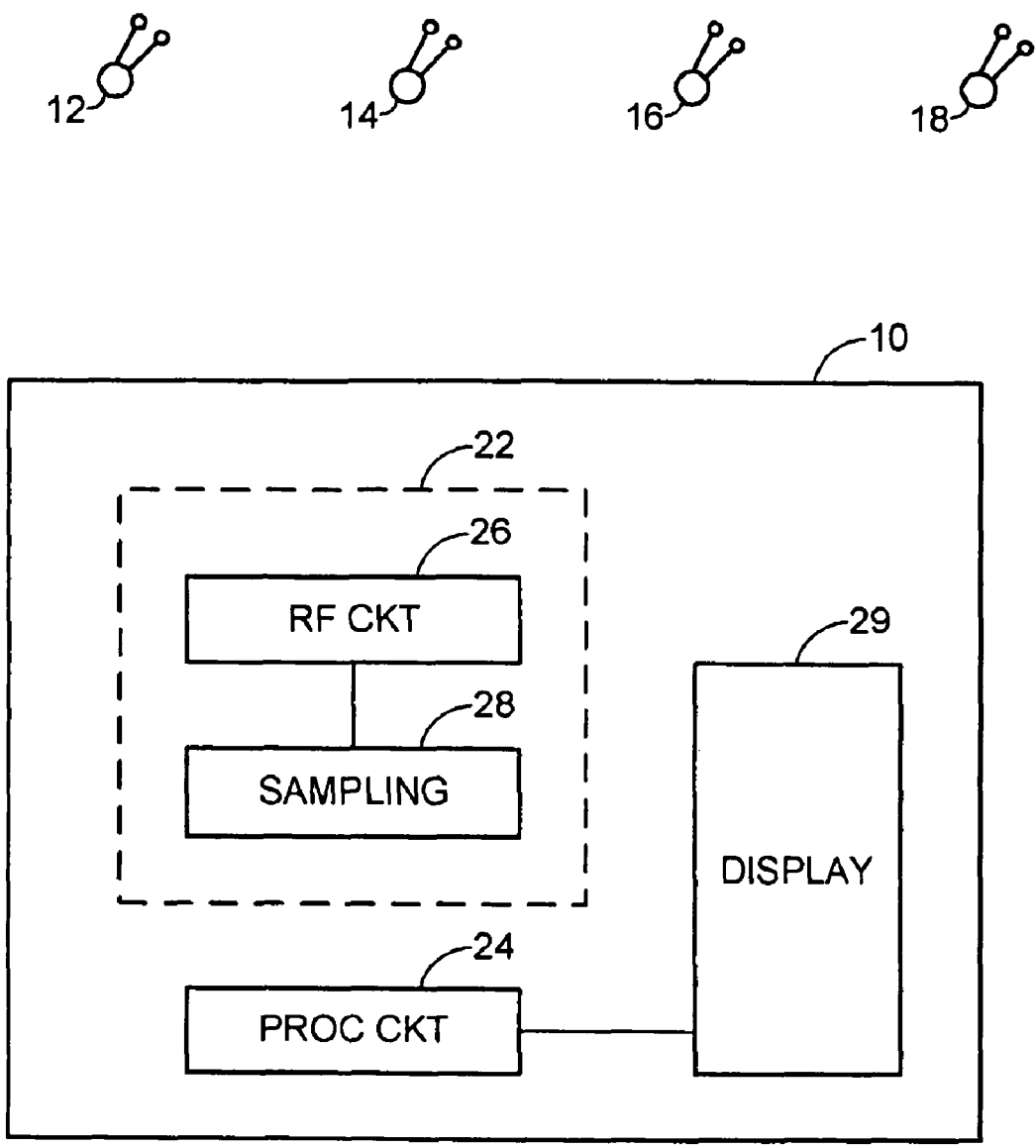
FIG. 1 shows a block diagram of a GPS receiver and four GPS satellites according to an exemplary embodiment of the present invention.

FIG. 1 shows a block diagram of an apparatus 10 for receiving and processing GPS signals, in an environment in which the apparatus 10 receives RF GPS signals from four satellites 12, 14, 16 and 18. The receiver 10 includes an antenna 20, an input circuit 22 and a processing circuit 24.

The input circuit 22 is operably connected to receive RF GPS signals detected by the antenna, and to convert the signals into digital IF signals. As is known in the art, GPS signals are transmitted on the known L1 carrier frequency 1575.42 MHz. In the embodiment described herein, the input circuit 22 includes an RF processing circuit 26 and a sampling unit 28. The RF processing unit 26 includes filtering, amplification and frequency conversion equipment known in the art, and is capable of generating an analog IF signal from the 1575.42 signal. The sampling unit 28 is a device operable to sample, and preferably downsample, the analog IF signal in order to generate the digital code signal.

As is known in the art the code signal consists of a transmitted code (from one of the satellites 12, 14, 16 and 18) plus a noise element. The received signal may thus be represented as:

$$r_q = A d_q c_q \cos(\Theta + f_d t_q) + n_q,$$

where $r_q$ is a received value at a sample index q, A is the amplitude of the transmitted signal, $d_q$ is the transmitted navigational data value at a sample q, $c_q$ is the transmitted C/A code value at the sample q, $\Theta$ is the phase, $f_d$ is the Doppler shift, and $n_q$ is the noise added at the sample q. The navigational data $d_q$ includes the position information provided by the satellite, each data bit having a duty cycle of 20 milliseconds, and each bit having a value of either −1 and +1.

Figure 2:
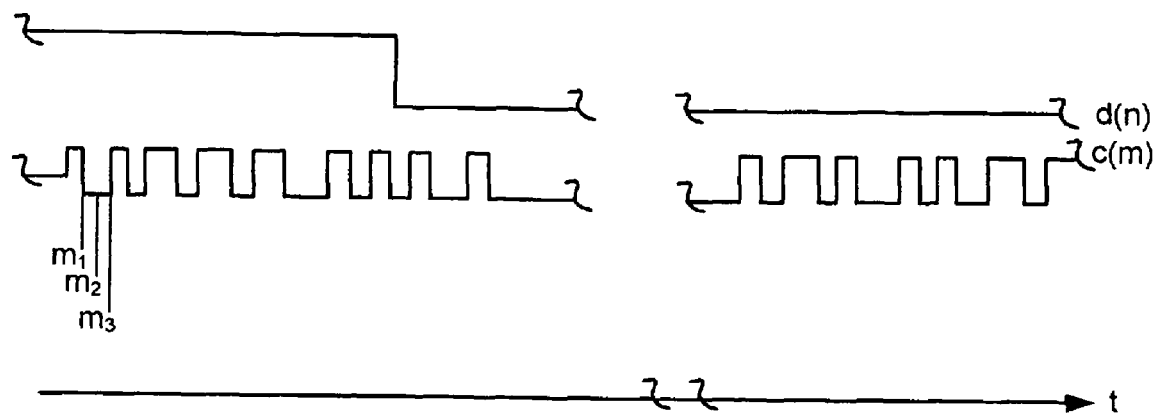
FIG. 2 shows a timing diagram of constituent elements of the GPS baseband signal.

FIG. 2 shows a timing diagram of the components of an exemplary transmitted signal including the data signal d(n) and the C/A code c(m). The rate of n is 50 Hz, while the rate of m is 1,023,000 chips/sec. As discussed above, there are approximately 1023 code bits in the C/A code sequence for each satellite, and the C/A code sequence is repeated twenty times for each data signal bit d(n). FIG. 2 furthermore shows exemplary sample times q which are used to develop the received signal $r_q$. Thus, d(n), as used herein, represents the data signal value for a data signal bit indexed n, while $d_q$ represents the value of the data signal d(n) for each sample q that is taken. Similarly, $c_q$ represents the value of the data signal c(m) for each sample q that is taken.

In general, the processing circuit 24 is a digital processing circuit that is operable to acquire GPS signals using the digital code signal $r_q$. Acquiring a GPS signal means that the processing circuit 24 is able to identify a particular C/A code sequence unique to the satellite that transmitted the signal, and successfully predict the starting time of the C/A code sequence. The processing circuit 24 is further operable to track the acquired code using known methods, which allows the processing circuit to obtain the navigational data signal d(n) over time and to further ascertain the alignment of the internal code with the received code.

The processing circuit 24 is also operable to generate a delay value representative of a delay between an internal code replica c'(m) and the code c(m) of the received signal $r_q$. This delay is the delay $\delta_n$, which was described above. To this end, in accordance with aspects of some embodiments of the invention, the processing circuit 24 is operable to perform long coherent and incoherent integrations using circular correlation to acquire the C/A code c(m) and hence recovery of the navigation data bits d(n). This method also helps determine a Doppler frequency shift caused be relative motion between one of the satellites and the receiver 10. The Doppler frequency is required because the frequency of C/A code bits as well as the frequency of the data bits shift from their expected frequencies. The knowledge of the Doppler frequency shift allows for accurate alignment of the internal C/A code replica with the received C/A code signal. The processing circuit 24 and the other circuits of the receiver are used to acquire $\delta_j$ values for each of the satellites 12, 14, 16 and 18.

The processing circuit 24 is further operable to receive the navigation data $d_j(n)$ for each satellite j when the C/A code of the satellite is acquired and tracked, as is known in the art. The navigation data $d_j(n)$ provides the $x_j$, $y_j$, and $z_j$ position information for each satellite j. Once the position information and the delay information for four satellites 12, 14, 16 and 18 are known, the position of the receiver may be solved using the system of equations discussed above. To accomplish the foregoing, the processing circuit 24 may suitably be one or more microprocessors, co-processors, digital signal processors, controllers, discrete or custom processing devices or combinations thereof.

Figure 3:
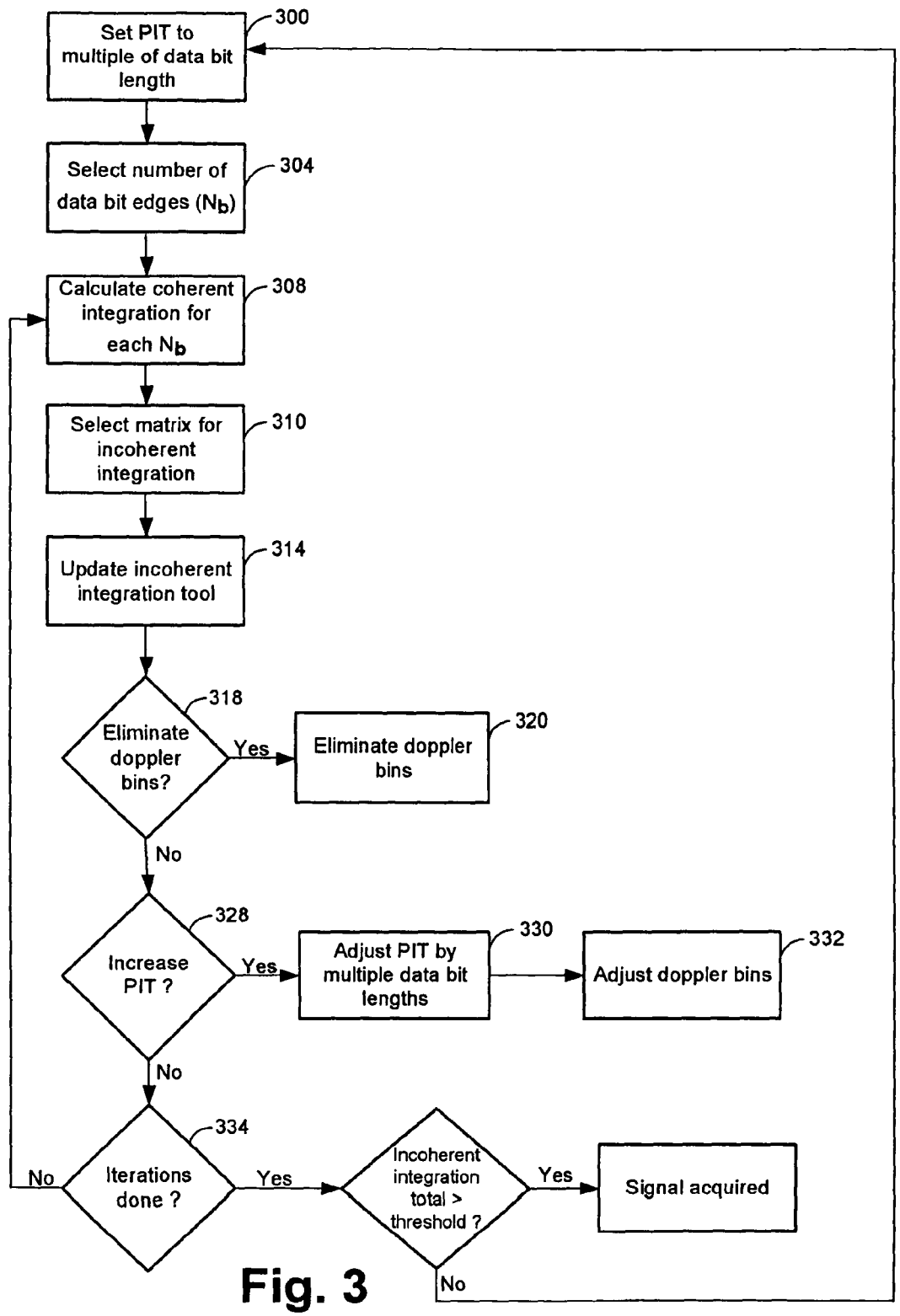
FIG. 3 shows a flow diagram of an exemplary set of operations for the processing circuit of the GPS receiver in FIG. 1.

An exemplary process performed in accordance with the principles of the present invention that may be implemented by the processing circuit 24 is shown in FIG. 3. The process commences by selecting a predetection integration time interval (PIT) that is a integral multiple of the time length of a data bit in the navigational data signal (block 300). For reasons discussed in more detail below regarding Doppler bin elimination, the PIT is preferably set to one multiple of the data bit length for the first step, namely, 20 ms for a GPS signal. Thereafter, when PIT is increased, it is increased by an integral multiple of the data bit length. For each possible Doppler shift in the PIT, a Doppler compensated $I_L$ local signal and a $Q_L$ local signal are generated at the sampling times. Thus, the relative delay between the received and the local codes stay approximately the same during acquisition. Because the maximum acquisition time is only a few seconds, the start of the PIT, at worst case, is off by only a few samples from the bit edge transition and the number of those samples may be found from $\delta_T$.

The number of data bit edges for the PIT is then selected (block 304). The data bit edges are positions within the PIT for the start of a navigational data bit. They are aligned on 1 ms C/A code period boundaries and, at the 50 Hz rate for the navigational data signal, there are 20 possible bit edge positions within one data bit length. The total number of data edge positions selected for a PIT is denoted by the symbol $N_b$. To estimate the bit edge and align the coherent integration intervals with the bit edges, $N_b$ arrays of incoherent integrations are maintained in parallel. Each one consists of the results from $N_T N_{fd}$ delay-Doppler cells corresponding to each possible code delay and Doppler shift. Because only $N_b$ possible edge positions are considered, the number of samples by which the PIT may be off, as noted above, the negative effect of this discrepancy is negligible compared to the loss due to the separation between the actual bit edge position and the nearest of the $N_b$ possible edges. To reduce processing and memory requirements, $N_b$ is chosen to be less than 20 and the chosen edges are evenly spaced over the data bit intervals. The preferred range for the number $\geq 4$ and $<20$.

For each step, $N_b$ coherent integrations are computed with each one starting at a possible bit edge position (block 308, FIG. 3). They are performed over an interval using a Fast Fourier transform and the interval is $T_{FFT}$ ms in length, where $T_{FFT} = T_{dms}/N_b$, the separation between possible bit edges. The complex correlation between the received signal and the local one over each $T_{dms}$ ms within $T_{Ik}$ ms at a given bit edge b and at a step I of the acquisition may be expressed as:

$$s_{b,n_t}(\tau_u, f_{d_v})|_I = \sum_{h=1}^{N_b} \sum_{n=1}^{N_h} r(t_{\delta_{h,n_t}+n-1})\left[I_L(t_{\delta_{h,n_t}+n-1}, \tau_u, f_{d_v}) + jQ_L(t_{\delta_{h,n_t}+n-1}, \tau_u, f_{d_v})\right]|_I$$

where b=1, ..., $N_b$ is a possible bit edge index, nt=1, ..., $N_{tk}$ is the index of each $T_{dms}$ within one $T_{Ik}$, h is the index of each $T_{FFT}$ with one $T_{dms}$, n is the sample index within each $T_{FFT}$ ms, $N_h$ is the number of samples in the $T_{FFT}$, $\delta_{h,nt}$ is the index of the first sample in the $h^{th}$ $T_{FFT}$ ms of the current $T_{dms}$ ms. Defining the inner summation series above by $G_{h,b,nt}$ yields:

$$s_{b,nt}(\tau_u, f_{d_v})|_I = \sum_{h=1}^{N_b} G_{h,b,n_t}(\tau_u, f_{d_v})|_I$$

where the G term represents the coherent integration over $T_{FFT}$ ms. Each $T_{FFT}$ ms can be part of up to $N_b$ different $S_{b,nt}$ integrations. Therefore, each coherent integration over each $T_{FFT}$ ms is calculated only once and then used in all the G values that represent the coherent integration over that same $T_{FFT}$ ms. The coherent integration for each $T_{dms}$ ms at each possible bit edge may be found as follows. For the first $T_{dms}$ in the first step, $s_{1,1|1}$ is computed directly from the equation above. For $b=2, \ldots, N_b$, $n_t=1, \ldots, N_t$, and $I=1, \ldots, L$:

$$s_{b,n_t}(\tau_u,f_{d_v})|_I = s_{b-1,n_t}(\tau_u,f_{d_v})|_I - G_{1,b-1,n_t}(\tau_u,f_{d_v})|_I + G_{N_b,b,n_t}(\tau_u,f_{d_v})|_I$$

For $n_t=2, \ldots, N_t$ and $I=1, \ldots, L$ then:

$$s_{1,n_t}(\tau_u,f_{d_v})|_I = s_{N_b,n_t-1}(\tau_u,f_{d_v})|_I - G_{1,N_b,n_t-1}(\tau_u,f_{d_v})|_I + G_{N_b,1,n_t}(\tau_u,f_{d_v})|_I$$

and for $I=2, \ldots, L$ then:

$$s_{1,1}(\tau_u,f_{d_v})|_I = s_{N_b,N_t}(\tau_u,f_{d_v})|_{I-1} - G_{1,N_b,N_t}(\tau_u,f_{d_v})|_{I-1} + G_{N_b,1,1}(\tau_u,f_{d_v})|_I$$

These calculations generate $N_{tk}$ matrices of size $N_T \times N_{fd}$ for each of the $N_b$ possible bit edge positions. Each of these matrices is multiplied by the $2^{N_{tk}-1}$ possible data combinations and the results are added to form a coherent integration. The coherent integration is added incoherently to the previous accumulation to produce $N_b$ groups with each group containing $2^{N_{tk}-1}$ matrices. From each group, only one matrix is added to the new total incoherent integration and the other matrices are discarded (box 310, 314, FIG. 3). The chosen matrix corresponds to the most likely data combination in the last $T_{Ik}$. A circular correlation (FFT/IFFT) is performed to obtain the coherent integration as this technique is computationally efficient to implement the calculations set forth in this paragraph.

To select the matrix corresponding to the most likely data combination, different approaches are used in the process to increase the sensitivity of the receiver and reduce the degradation in the probability of detection due to a wrong combination. A general approach is defined as follows. Let $I_{coh_{b,E}}$ and $Q_{coh_{b,E}}$ define the real and imaginary parts, respectively, of coherent integration for a bit edge b and a data combination E that was calculated as described above. If $P_{b,I,E}$ defines the total incoherent integration at a step I for a possible bit edge b and a data combination E, it can be defined as:

$$P_{b,I,E}(\tau_u,f_{d_v}) = P_{b,I-1}(\tau_u,f_{d_v}) + [I_{coh_{b,E}}(\tau_u,f_{d_v})^2 + Q_{coh_{b,E}}(\tau_u,f_{d_v})^2]_I$$

Each $P_{b,I,E}$ is a matrix of size $N_T \times N_{fd}$. Only one of the $2^{N_{tk}-1}$ matrices for the $P_{b,I,E}$ is used to form the new $P_{b,I}$, which forms the new total integration for the step I. The selected matrix is the one that contains the maximum power in one of its cells out of all cells in all of the matrices.

The problem with this general approach is that the maximum may be a noise cell so the data cell should be chosen randomly. Therefore, one of the following alternatives is chosen in the beginning of the acquisition process. One alternative is to select PIT to be one data bit length long at the start of the acquisition process. This results in the power accumulation in the correct cell and reduces the probability of choosing a wrong data bit combination.

Another alternative is to keep track of all matrices generated for each group $N_b$ for a predetermined number of $D_i$ steps. At each step, the new coherent matrices are added incoherently to the previous ones. Thus, at the end of the $D_i$ steps, $2^{D_i(N_{tk}-)}$ matrices are generated and stored for each of the $N_b$ edges, assuming that $T_{Ik}$ does not change during the $D_i$ steps. The matrix having the maximum power in one of its cells after $D_i$ steps is used to form the new incoherent integration for each $N_b$ and the other matrices are discarded. In this alternative, $P_{b,I}$ is calculated every $D_i$ steps and the selected matrix is the one having the maximum power in one of its cells. One limitation of this alternative is the need for computational storage space.

In another alternative, the $2^{N_{tk}-1}$ matrices are generated for each $N_b$ and then the cells having the same index in each matrix are compared and a matrix comprised of the maximum cell at each index is formed. This matrix is added to the total incoherent integration to form the new total incoherent integration. This alternative results in some gain loss, but it does not cause degradation in the probability of detection because there is no loss from a wrong data combination being used. The noise power, however, may increase. This increase is offset by the higher gain compared to when $N_{tk}=1$ is used for the same total integration time.

Another alternative is to chose a different likely data combination for each code delay for all the Doppler shifts. This data combination is chose as the one that generates the maximum power among all the Doppler shifts in the $2^{N_{tk}-1}$ matrices at that code delay.

Preferably, one or more of the alternative approaches are followed for a number of steps equal to $N_{max}$ before switching to the general one described above. If the last two discussed are used, then the process performs the cell wise comparison technique for $N_{maxAll}$ steps and then switches to the different likely combination selection alternative for $N_{maxDelay}$ steps, so that $N_{max}=N_{maxAll}+N_{maxDelay}$. At the end of all steps for the acquisition process, the code delay and the Doppler shift estimates are the ones that correspond to the cell that has the maximum power among all the cells in the $N_b$ matrices, provided this maximum exceeds an acquisition threshold $\gamma$.

To avoid an increase in the number of Doppler bins as the PIT is increased, the process includes the elimination of Doppler bins. The elimination occurs at a predetermined number of process steps so when the predetermined number of steps have been performed (box 318), the processing circuit 24 eliminates Doppler bins. After the predetermined number of acquisition steps has occurred between Doppler elimination events, a percentage of the Doppler bins are eliminated (box 320). These are the Doppler bins that are unlikely to result in acquiring the signal. Because the correct cell contains information because of the correlation between the received signal and the local signal, it has a high value even though it may not be the maximum power value after the predetermined number of steps. Thus, some percentage of the Doppler bins may be eliminated without preventing the acquisition of the weak signal.

The Doppler bin elimination is performed by identifying the cell having the maximum power at each Doppler bin. This identification is performed for all of the $N_b$ incoherent integration results. The $N_b N_{fd}$ cells are ordered according to their power values from the maximum to the minimum. The Doppler bins corresponding to the higher power values are preserved. The number of bins preserved corresponds to a predetermined percentage of all Doppler bins before elimination begins for a step. The predetermined percentage may change by a maximum or minimum value depending upon wither Doppler bins are added or eliminated. Also, the number of Doppler bins is not permitted to go below a predetermined minimum. If the cutoff power value is repeated for a number of Doppler bins, all of the Doppler bins having the cutoff power value are retained. Numerical values for the percentage cutoffs, the amount of change in the number of bins, and the minimum number of Doppler bins to be retained for a step as well as the number of steps between Doppler bin eliminations are determined from simulations.

The elimination of Doppler bins enables the acquisition process to begin with a small PIT and then increase the PIT as Doppler bins are eliminated without a corresponding increase in the computational resources required for acquisition processing. The process determines whether the PIT can be increased (block 328). The condition for enabling the increase of the PIT is $(\mu/(T_{I_k}-T_{I_{k-1}}))N_{bin_z} \leq N_{bin_{max}}$, where $N_{bin_{max}}$ is the maximum number of Doppler bins, $T_{I_k}$ and $T_{I_{k-1}}$ are the $k^{th}$ and $(k-1)^{th}$ PIT lengths and $\mu$ is a fraction used to determine the minimum separation between any two consecutive Doppler bins where $0<p\leq 1$. For example, at the $k^{th}$ PIT, the minimum separation is $\mu/T_{I_k}$.

After the PIT is increased, the remaining Doppler bins are not a range of frequencies with constant separation as a result of the elimination of Doppler bins. Consequently new Doppler bins are defined to account for the narrower bandwidth resulting from the increase in the PIT. The new Doppler bin frequencies are calculated as follows: $N_{DopRng}$ number of ranges are formed from the remaining Doppler bins with frequency separation of $\mu/T_{I_{k-1}}$.KHz. The separation between any two adjacent ranges are larger than this, however, as a result of the prior eliminations. To correct for this result, $D_{k-1,I,nr}$ and $D_{k,j,nr}$ are defined as the frequencies of, respectively, the $i^{th}$ Doppler bin in the $nr^{th}$ range of $T_{I_{k-1}}$. and the $j^{th}$ Doppler bin in the $nr^{th}$ range of $T_{I_k}$.nr=1, ..., $N_{DopRng}$. The true Doppler shift could lie at a separation in frequency as large as $(0.5\ \mu/T_{I_{k-1}})$ from one of the ranges. For each of the $N_{DopRng}$ ranges, the frequencies of the new Doppler bins are found by calculating the first and the last Doppler bin frequencies as $D_{k,1,nr}=D_{k-1,1,nr}-(\frac{1}{2})(\mu/T_{I_{k-1}})$, $D_{k,last,nr}=D_{k-1,N_{k-1,nr},nr}+(\frac{1}{2})(\mu/T_{I_{k-1}})$, where $N_{k-1,nr}$ is the total number of the Doppler bins in the $nr^{th}$ range of $T_{I_{k-1}}$. The total number of Doppler bins $N_{k,nr}$ in the $nr^{th}$ range of $T_{I_k}$ can be calculated from $N_{k,nr}$=the least integer larger than $(T_{I_k}/\mu)|D_{k,last,nr}-D_{k,1,nr}|+1$. The frequencies of the remaining bins are found from $D_{k,I,nr}=D_{k,i-1,nr}+\mu/T_{I_k}$, for i=2, ..., last. Since some of the new Doppler bins at the $k^{th}$ PIT do not have an accumulation result up to the current step, their accumulations are set to the accumulation of the nearest old bins.

Once the process detects that all of the acquisition steps have been performed (box 332), the incoherent integration total is compared to a threshold $\gamma$ (box 336). If it is greater than the threshold, the code delay is identified (box 338) and the estimated Doppler shift and the change in the code delay $\Delta\tau$ relative to the start of the acquisition interval may be determined in a known manner from the estimated Doppler shift. The threshold is determined by a search process. Every value for $\gamma$ and the total number of integrations, L, yield a certain probability of false alarm ($p_f$) and probability of detection ($p_d$). The probability of false alarm refers to the probability that a power value higher than the threshold is generated if there is no signal present. The probability of detection refers to a power value that exceeds the threshold at the correct cell where the signal is present. A simulation is used to search for the $p_f$ that is $\leq$ the desired probability of false alarm and for a $p_d$ that is $\geq$ the desired probability of detection.

An exemplary table of settings for a processing circuit 24 implementing the process described above is shown in Table 1.

TABLE 1

| Parameter | 17 dB-Hz | 15 dB-Hz | 10 dB-Hz |
|---|---|---|---|
| Initial PIT (ms) | 20 | 20 | 20 |
| Final PIT (ms) | 120 | 120 | 120 |
| Number of steps for each PIT | [10 10 5 2 2 1] | [30 30 4 4 4 7] | [60 45 20 20 10 16] |
| Total number of steps | 30 | 79 | 171 |
| First number of acquisition steps between Doppler bin elimination steps ($N_{ez}$) | 5 | 15 | 15 |
| Change $N_{ez}$ after | 25 steps | 60 steps | 105 steps |
| Percentage of Doppler bin elimination | [.3 .35 .4 .5 .7 .8] | [.2 .25 .6 .7 .7 .8] | [.35 .2 .25 .4 .45 .6] |
| Amount of change in Doppler bin elimination percentage | [−.05 −.05 0 0 0] | [−.05 0.05 0 0 0] | [−.25 0.05 0 0 0] |
| Maximum change in Doppler bin elimination | [.2 .3 .4 .5 .7 .8] | [.15 .3 .6 .7 .7 .8] | .05 .25 .25 .4 .45 .6] |
| Minimum number of Doppler bins for a step level | [80 40 40 10 5 5] | [80 40 40 10 5 5] | [100 80 80 60 20 5] |
| Maximum number of step before switching to general approach for eliminating Doppler bins | 29 | 70 | 160 |
| Number of steps for cell wise comparison in Doppler bin elimination | 15 | 40 | 160 |

TABLE 1-continued

| Parameter | 17 dB-Hz | 15 dB-Hz | 10 dB-Hz |
| --- | --- | --- | --- |
| Number of steps for different likely data combination approach for Doppler bin elimination | 14 | 30 | 0 |

Figure 4:
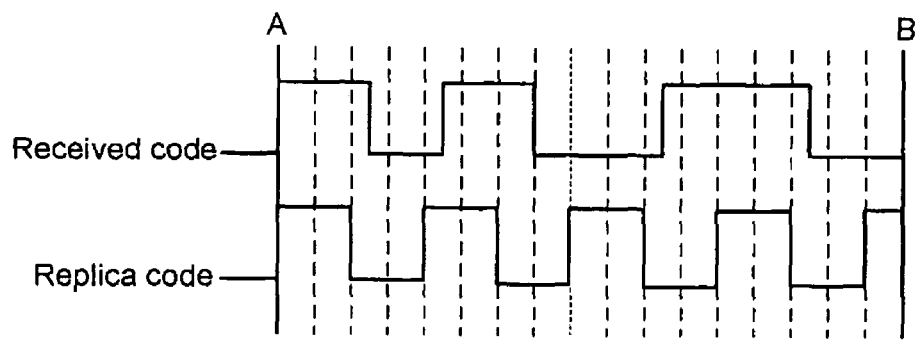
FIG. 4 illustrates the problems with using an uncompensated replica code for coherent integration calculations.

Another embodiment of the present invention uses a double block zero padding scheme to compute the coherent integrations in the process shown in FIG. 3. As shown in FIG. 4, a replica code that is not compensated for the Doppler effect on the code duration does not align well with the received signal. In the figure, the upper code is the received code and a negative Doppler shift causes the code length to increase. The lower code is the uncompensated replica code and the dotted lines indicate sampling periods over the coherent integration interval that spans from A to B. This figure illustrates that a fraction of the code chip between subsequent samples is not the same in the received code as it is in the replica code. Thus, by the end of the integration interval, the received code has produced fewer chips than the replica code. This causes the relative delay between the two codes to change and a subsequent incoherent integration is added at the wrong delay.

In a system using the modified DBZP scheme the received IF signal is converted to baseband. The selection of the PIT also includes arranging the $T_I$-long baseband samples into blocks (block 500, FIG. 5). The number of blocks is equal to the number of Doppler bins $N_{fd}$. The Doppler bin separation is $1/T_I$. The block size includes $S_{block}$ samples. Every block of received samples is then augmented with the subsequent block. Thus, the number of blocks remains the same, but each block is now twice as long. $T_I$-long samples of the replica code are arranged into the same number of blocks and each block of the replica code is padded with $S_{block}$ zeros to produce $N_{fd}$ block of length $2S_{block}$ (block 504). This is done for each of the $N_{range}$ frequencies with a length of TI ms.

For each $N_{range}$ frequency, a circular correlation is calculated between each two corresponding blocks of the received baseband signal and the locally generated C/A code samples (block 508). The circular correlation between each two blocks produces a block of size $2S_{block}$ points. The first $S_{block}$ points of each resultant block are preserved, while the rest are discarded (block 510). The preserved points from all the blocks are arranged in a form of a matrix of size $N_{fd} \times S_{block}$. The $jj^{th}$ column contains the results at index jj from each resultant block. The $ii^{th}$ row contains the results of the $ii^{th}$ block. For the $i^{th}$ Doppler range, these results are appended to a matrix $M_{ci}$ at the row indices from $[(N_b-1)N_{bEdge}+1]$ to $[(N_b-1)N_{bEdge}+N_{fd}]$ and at column indices from $[(m_r-1)S_{block}+1]$ to $[m_rS_{block}+1]$.

For each step, the blocks of the replica C/A code are circularly shifted by one block so that the first block is move back to become the last one, while the rest of the blocks are shifted one block position to the front (block 514). After all the replica codes have been shifted and correlated to the sample (block 518), the matrix $M_{ci}$ has $N_{step} \cdot S_{block} = N_T$ columns. A temporary matrix $M_{cTemp}$ is appended to $M_{Ci}$ at the row indices from 1 to $(N_b-1)N_{bEdge}$ and at the column indices from 1 to $N_T$ (block 520). The elements of $M_{ci}$ at row indices from $[N_{fd}+1]$ to $[N_{fd}+(N_b-1)N_{bEdge}]$ and column indices from 1 to $N_T$ are preserved in the matrix $M_{cTemp}$, for use in the next acquisition step (block 524). The matrix $M_{ci}$ is divided into $N_b$ overlapping matrices. Each matrix $M_{cbi}$ is of size equal to $N_{fd} \times N_T$ and represents the result of the $b^{th}$ possible bit edge position (block 528).

Because each of the matrices $M_{cbi}$, where $b=1, \ldots, N_b$ is generated from a data of size equal to the coherent integration time $T_I$, where $T_I = N_t T_{dms}$, then each $N_{fd}/N_t$ rows of the $M_{cbi}$ matrix may be viewed as being generated using one of the $N_t$ bits. Thus, before performing the last integration necessary to form the coherent integration for a total integration time of $T_I$, each $M_{cbi}$ matrix is multiplied by one of the $2^{N_t-1}$ possible data bit combinations. This multiplication generates $2^{N_t-1}$ matrices for each of the $N_b$ possible bit edges. These matrices may be denoted as $M_{cEbi}$, where $E=1, \ldots, 2^{N_t-1}$.

The coherent integration is found by applying an FFT to each column of these $N_b 2^{N_t-1}$ matrices (block 534). Each cell (ii,jj) corresponds to the correlation at the Doppler bin ii and the code delay jj. The rows at the offset $O_{fsi}$ to $O_{fei}$ of the $M_{cEbi}$ matrix represent the coherent integration of the Doppler shifts of the $i^{th}$ Doppler range. Only these rows are appended to a matrix $M_{cEb}$ at offset $O_{fsi}$ to $O_{fei}$. The other rows of the $M_{cEbi}$ matrix are discarded (block 538).

The process continues for other frequency samples (block 540). At the end of this processing, $N_b 2^{N_t-1}$ matrices have been generated, each of which is of size $N_{fd} \times N_T$ and represents a $T_I$ coherent integration. The process continues by compensating for the code length change resulting from the difference in the Doppler frequencies between the middle $f_{mid}$, of each $N_{range}$ and the other Doppler frequencies of each $N_{range}$ (block 544). Because each row of $M_{cEb}$ corresponds to a possible Doppler frequency, the compensation may be performed by circularly shifting each row by the number of samples $N_{sv} = \text{sign}(f_{dv} - f_{midi}) \text{round}[(I-1)T_I f_s(|f_{dv} - f_{midi}|/f_{L1})]$, where $f_{L1}$ is the carrier frequency. The number of samples depends upon the difference between $f_{midi}$ and the frequency of the Doppler bin $f_{dv}$. The shifted rows form the coherent integration for the $I^{th}$ step.

For each possible bit edge position, one matrix of the $2^{N_t-1}$ matrices is preserved and the rest are discarded (block 548). This matrix corresponds to the most likely data combination. To select the matrix corresponding to the most likely data combination, different approaches are used in the process to increase the sensitivity of the receiver and reduce the degradation in the probability of detection due to a wrong combination. A general approach is defined as follows. Let $I_{coh_{b,E}}$ and $Q_{coh_{b,E}}$ define the real and imaginary parts, respectively, of coherent integration for a bit edge b and a data combination E. If $P_{b,I,E}$ defines the total incoherent integration at a step I for a possible bit edge b and a data combination E, it can be defined as:

$$P_{b,I,E}(\tau_u, f_{dv}) = P_{b,I-1}(\tau_u, f_{dv}) + [I_{coh_{b,E}}(\tau_u, f_{dv})^2 + Q_{coh_{b,E}}(\tau_u, f_{dv})^2]_I$$

In this equation, $\tau$ is a possible code delay, $u=1, \ldots, N_T$; and $f_{dv}$ is a possible Doppler shift, $v=1, \ldots, N_{fd}$. Each $P_{b,I,E}$ is a matrix of size $N_T \times N_{fd}$. Only one of the $2^{N_{tk}-1}$ matrices for the $P_{b,I,E}$ is used to form the new $P_{b,I}$, which forms the new total integration for the step I. The selected matrix is the one that contains the maximum power in one of its cells out of all cells in all of the matrices.

The problem with this general approach is that the maximum may be a noise cell so the data cell should be chosen randomly. Therefore, the following alternatives are done in the beginning of the acquisition process. In the first alternative, the $2^{N_{tk}-1}$ matrices are generated for each Nb and then the cells having the same index in each matrix are compared and a matrix comprised of the maximum cell at each index is formed. Thus, the likely data bit combination is estimated separately for each cell so that at a delay Tu and Doppler fdv, the new result is:

$$P_{b,l}(\tau_u, f_{d_v}) = \max \left\{ \begin{array}{l} P_{b,l1}(\tau_u, f_{d_v}), \\ P_{b,l2}(\tau_u, f_{d_v}), \ldots, P_{b,l2^{N_{tk}}-1}(\tau_u, f_{d_v}) \end{array} \right\}$$

This selection method is used for $N_{maxAll}$ steps. Following that, a second alternative is used where a different likely data combination is chosen for each code delay for all the Doppler shifts. This data combination is chosen as the one that generates the maximum power among all the Doppler shifts in the $2^{N_{tk}-1}$ matrices at that code delay. This method is used for $N_{maxDelay}$ steps, so that $N_{max}=N_{maxAll}+N_{maxDelay}$. At the end of the $N_{max}$ steps, the process performs the general approach discussed above.

Figure 5:
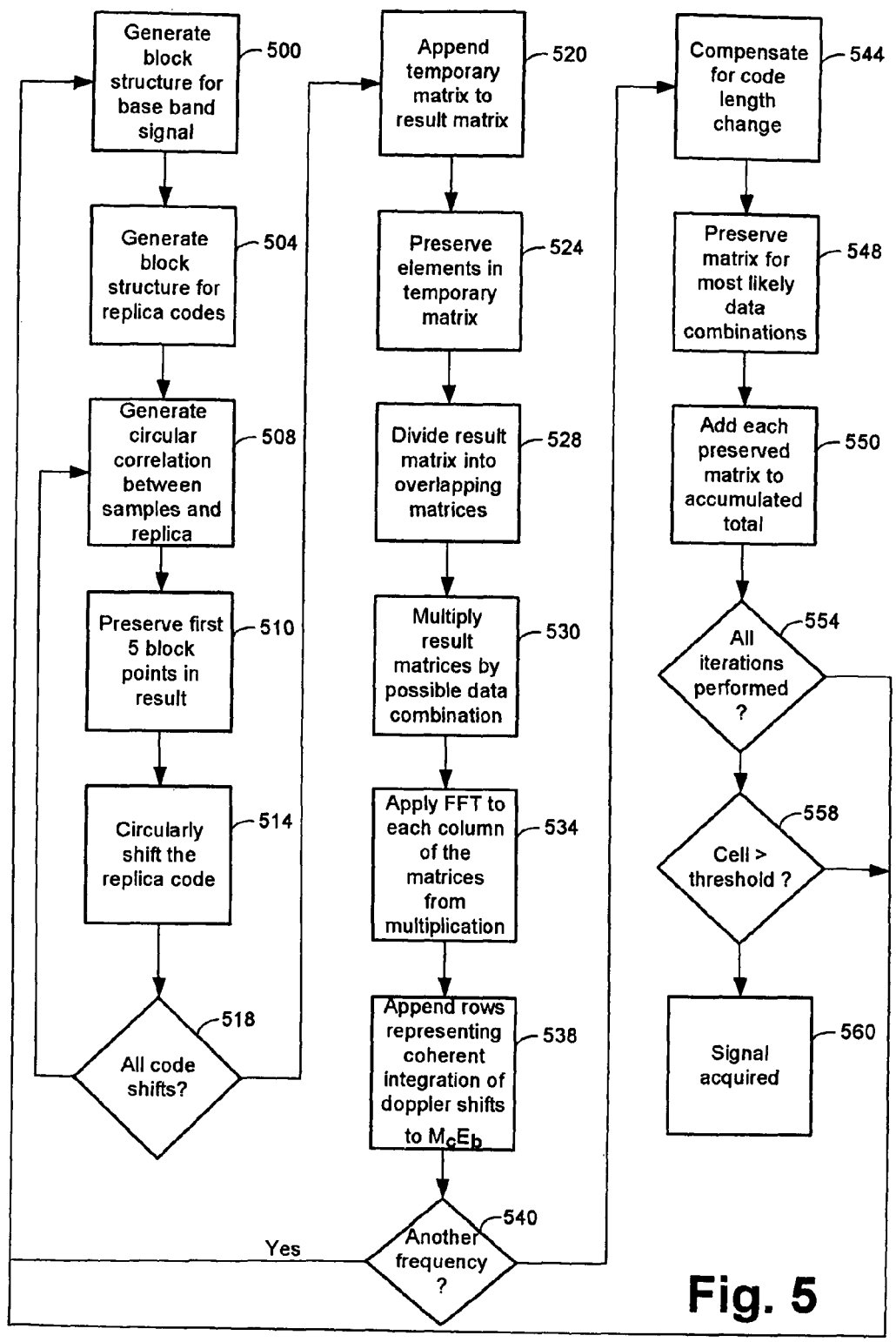
FIG. 5 shows a flow diagram for an exemplary set of operations for the implementing modified double block zero padding processing of a received signal with local replica codes with the processing circuit shown in FIG. 1.

The process in FIG. 5 continues by adding incoherently each of the $N_b$ preserved matrices to the corresponding previous total accumulation (block 550). At the end of each step in the acquisition, there are $N_b$ accumulations. After the acquisition steps are performed (block 554), any cell in the matrix having a value that exceeds the threshold γ (block 558) indicates that a satellite has been detected (block 560). The cell containing the maximum power corresponds to the estimated code delay and Doppler shift. The matrix containing this maximum also corresponds to the estimated bit edge position.

Figure 6:
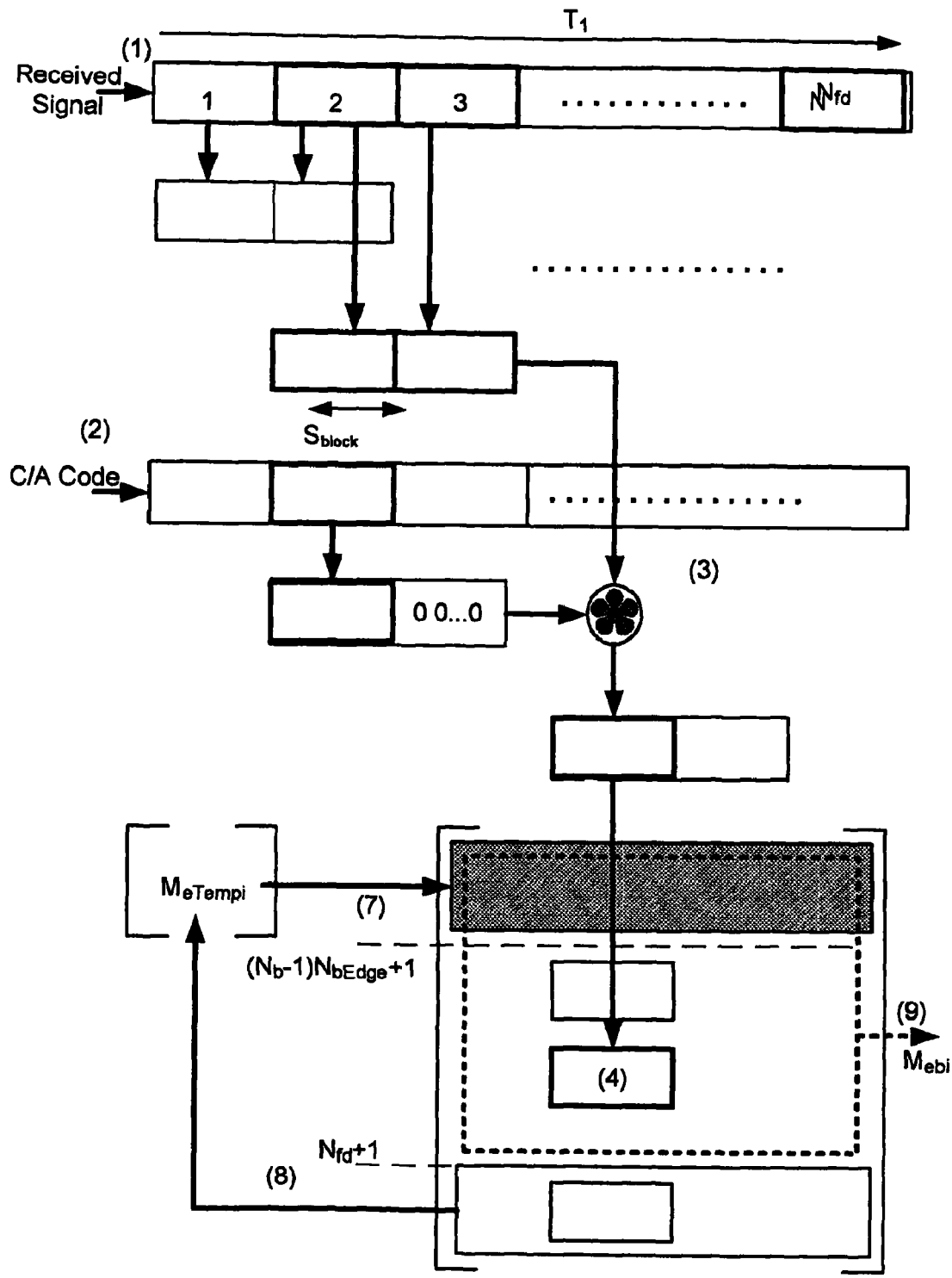
FIG. 6 is a depiction of the modified double block zero padding (DBZP) processing.

FIG. 6 depicts on overview of the acquisition process using the modified double block zero processing. The received signal is segmented into blocks as described above and the replica code is also segmented. The replica codes are taken one block at time with the trailing zero padding. The received signal is processed two blocks at a time. The operation between the two signals generates a result of which only the lead portion is preserved. This portion is incorporated in the matrices used for the acquisition integrations in the process described above.

The method shown in FIG. 6 may be used to acquire a GPS signal in the presence of strongly interfering signals. The method is similar to those described above except the total number of integrations L and the acquisition threshold γ are designed with reference to noise and the interfering signal. The probability of a false alarm in this scenario pf is calculated as pf=max $\{p_{fn}, p_{DC}\}$, where $p_{fn}$ is the probability of false alarm if there is no interfering signal and $p_{DC}$ is the probability of detection of the interfering signal. The threshold γ is calculated from γ=max $\{\gamma(p_{fn}),\gamma(p_{DC})\}$, where $\gamma(p_{fn})$ is the threshold calculated based on the noise power and $p_{fn}$ while $\gamma(p_{DC})$ is the maximum expected power level of the interfering signal.

To be able to use a PIT multiple $N_t$ of $T_{dms}$, the most likely data combination is estimated in each cell independently of the other cells through the acquisition process so $N_{max}=L$. Also, an alternative method is to choose one most likely data combination for each Doppler bin at all of its code delays. This is the combination that generates the maximum power for that Doppler bin. Both $p_f$ and γ are calculated with reference to the correct PDF resulting from such an approach. The PDF and $p_f$ are calculated numerically because it is not possible to calculate them in a closed form.

A bound on the calculation of $p_f$ may be expressed as $$p_f \leq \sum_{j=1}^{N_{cell_m}} \left[1 - F_{S_{Sj}}(\gamma)\right] + (N_{cell} - N_{cell_m})[1 - F_{S_L}(\gamma)]$$

where $F_{S_{Sj}}(\gamma)$ is obtained by integrating the following equation from 0 to γ and from γ to ∞:

$$f_{S_j}(s) = f_{N_{max}} * f_{q1jN_{rest_l}} * \ldots * f_{qN_{T_l}jN_{T_i}} * f_{(1-q_j)N_{rest}},$$

where $fq_{kj}N_{rest_k}$ is a PDF obtained by convolving $fq_{kj}N_{rest_k}$ functions of the $f_{Wk}(w)$. While $f_{(1-q_j)N_{rest}}$ is a PDF with a form:

$$f_s(s) = \frac{1}{2^{L_k}} \frac{s^{L-1}}{(L-1)!} e^{-\frac{s}{2}}$$

except $(1-q_j)N_{rest}$ replaces L.

Figure 7:
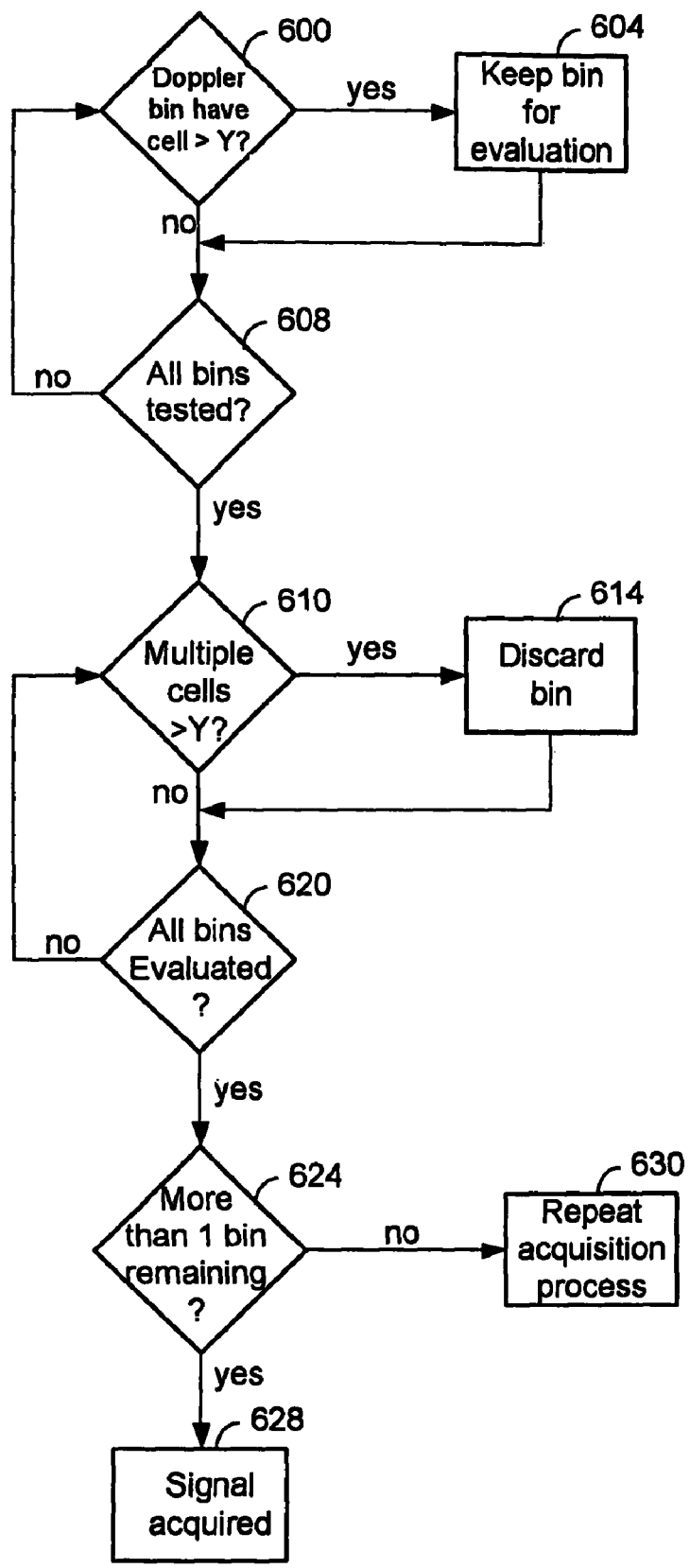
FIG. 7 shows a flow diagram for an exemplary set of operations for acquiring a weak signal in the presence of strongly interfering signals that may be used with the system shown in FIG. 1.

A method for acquiring a weak signal in the presence of strongly interfering signals is shown in FIG. 7. The method works if the Doppler shift of the strong signal does not affect the Doppler shift of the correct signal. That is, the Doppler shift of the interfering signal does not appear on the same bin as the Doppler shift of the correct signal. In this method, the threshold γ is computed with reference to noise only. Also, the most likely data bit combination is estimated in each cell independently of other cells through the acquisition process so $N_{max}=L$. The method begins by testing whether a Doppler bin has a cell that exceeds a threshold γ that has been computed with reference to noise only (block 600). Those bins have a cell that exceeds the threshold are kept for later evaluation (block 604) and the testing continues until all bins have been tested (block 608). The process determines if more than one code delay exceeds the threshold for a Doppler bin (block 610). If it does, the bin is discarded (block 614). This evaluation continues until all Doppler bins have been evaluated (block 620). If only one Doppler bin has a code delay greater than the threshold (block 624), the signal has been acquired (block 628). Otherwise, the acquisition process continues (block 630).

Figure 8:
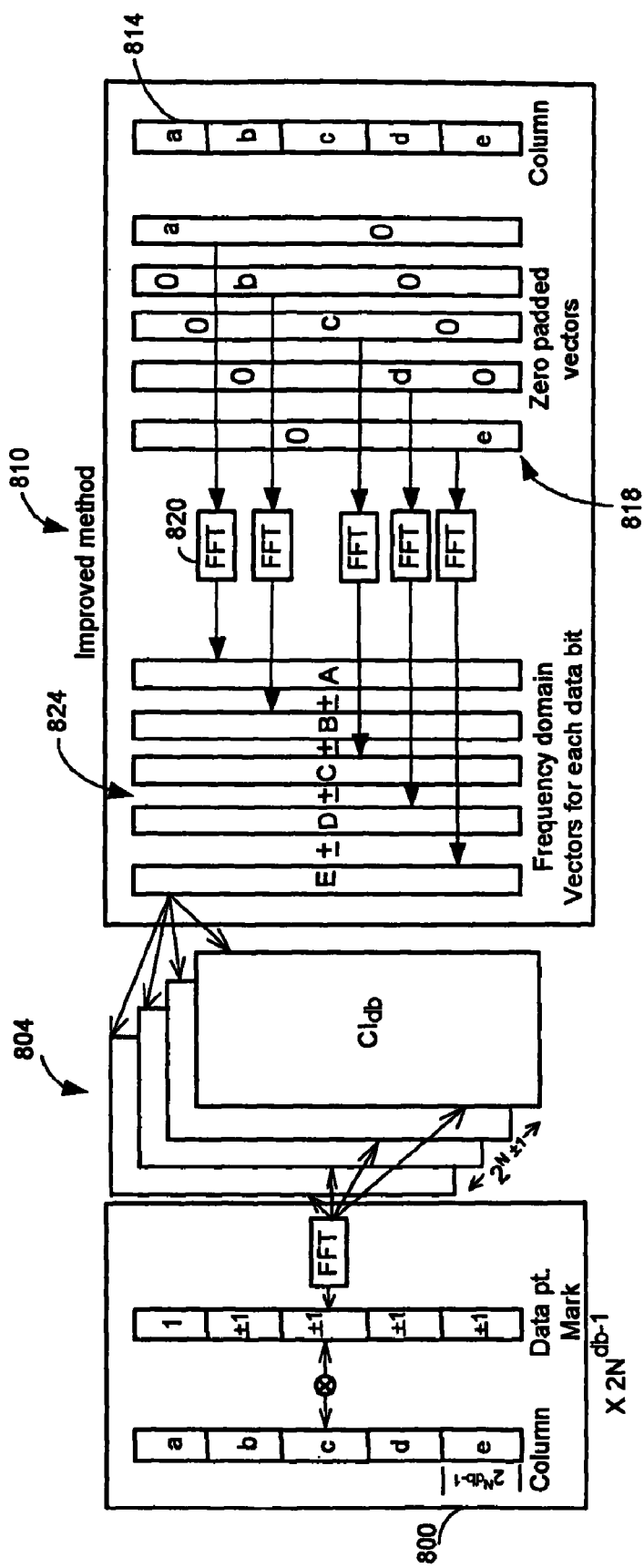
FIG. 8 depicts differences between the modified DBZP process and a more computationally efficient DBZP method.

While the double block zero padding method provides advantages over previously known DBZP methods, it still consumes computational resources that may not be available in some portable devices. For example, each column in the $2^{N_t-1}$ matrices denoted as $M_{cEbi}$, where E=1, ..., $2^{N_t-1}$, in the discussion above, $2^{N_t-1}$ vector multiplications and $2^{N-1}_t$ FFTs must be computed. In an improvement of the DBZP method described above, an analytically equivalent, but more computationally efficient method may be used to generate the $M_{cEbi}$ matrices. The method may be described and compared with the method discussed above with reference to the illustration presented in FIG. 8. The previously described method 800 is shown as generating a set of coherent integration matrices 804. In the more computationally efficient method 810, a column vector 814 of a time domain matrix that has been formed from segments from a sample of the baseband vector and zero padded segments from a sample of the code acquisition signal vector. The data in the cells of the column vector 814 are used to generate zero padded column vectors 818. Each of these zero padded vectors includes at least one data unit from the column vector 814 that has been placed in the zero padded vector at the same position the data unit had in the column vector. The remaining cell locations in the zero padded vector are filled with zeros. Thus, the number of zero padded vectors corresponds to the number of data units in the time domain coherent integration matrix column.

A fast fourier transform (FFT) 820 of each zero padded column vector is obtained to generate a corresponding number of frequency domain vectors 824 for each column. The FFT may be a zoom fast fourier transform (ZFFT) as discussed below. All addition and subtraction combinations of the frequency domain vectors for each column are computed. The number of these combinations is equal to $2^{Ndb-1}$ where $N_{db}$ is the number of data units in the column vector 814. A plurality of frequency domain coherent integration matrices 804 are formed with the computed addition and subtraction combinations of the frequency domain vectors for each column. Each coherent integration matrix in the plurality of coherent integration matrices corresponds to one data bit combination of the satellite signal acquisition code sample. The plurality of matrices generated by this method is analytically equivalent to the $M_{cEbi}$ matrices described above. In this method, however, the vector multiplications have been replaced with vector additions, which are more computationally efficient.

Figure 9:
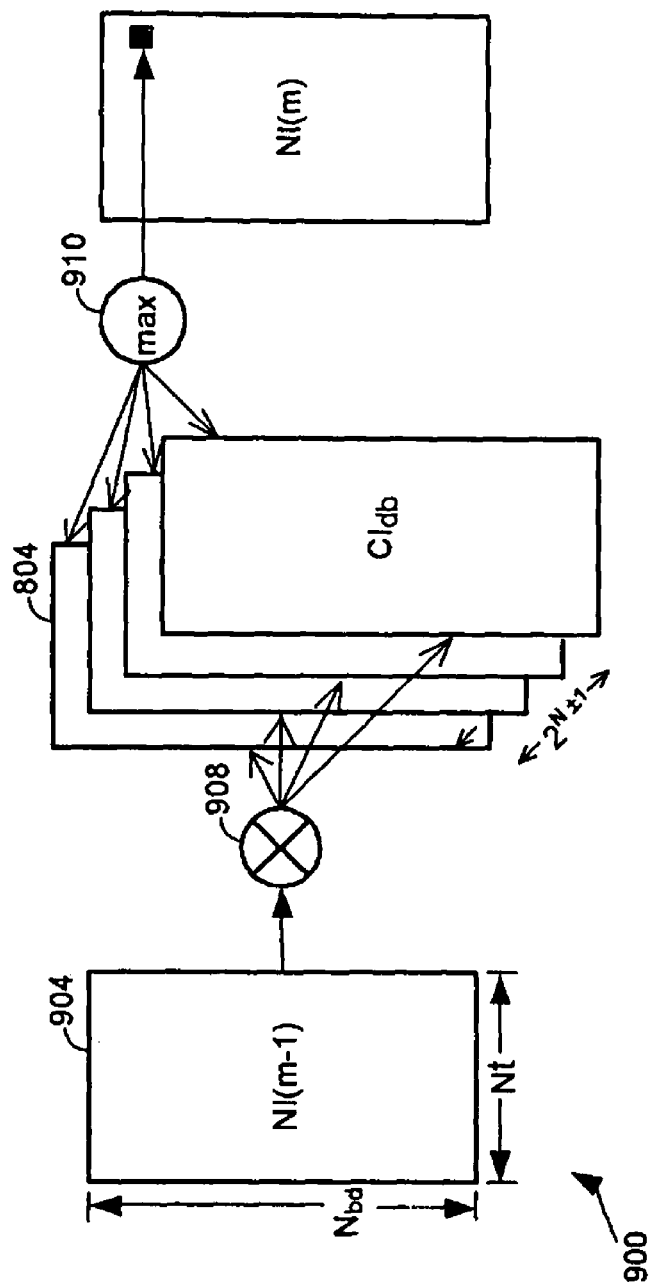
FIG. 9 depicts a more computationally efficient incoherent integration method.

An additional efficiency may be gained during the incoherent integration that follows the coherent integrations on the plurality of coherent integration matrices formed as described above. The incoherent integration process 900 is depicted in FIG. 9. After the first plurality of coherent integration matrices are formed, an incoherent integration matrix 904 is formed by computing a cell-wise maximum matrix over the coherent integration matrices in the plurality of coherent integration matrices. That is, a matrix is formed in which each cell of the matrix is populated with the maximum value for that cell position in the plurality of coherent integration matrices. This matrix is the incoherent integration matrix.

During the next coherent integration, another column 814 is taken from another time domain matrix generated from segments from the next sample of the base band signal and segments from the next sample of the acquisition code. Likewise, the zero padded vectors 818 for each data unit in the column vector are generated, and the FFTs 820 for the zero padded vectors are performed to generate a corresponding number of frequency domain vectors 824 for each column. Again, all addition and subtraction combinations of the frequency domain vectors for each column are computed and another plurality of coherent integration matrices 804 are formed with the computed addition and subtraction combinations of the frequency domain vectors for each column. Each coherent integration matrix in the plurality of coherent integration matrices corresponds to one data bit combination of the satellite signal acquisition code. The incoherent integration 904 formed by the cell-wise operation described above is then added 908 to each coherent integration matrix in the plurality. Another cell-wise operation 910 to identify the maximum cell value at each cell position over the plurality of coherent integration matrices is performed to form a new incoherent integration matrix 914. This process continues until the last base band sample and code sample have been used to generate a last plurality of coherent integration matrices and the cell-wise operation performed to generate a last incoherent matrix. The maximum cell in the incoherent matrix identifies a true code phase delay.

The above-described incoherent integration process alleviates the need for storage caused by a more conventional incoherent integration approach. For each coherent integration, $2^{Ndb-1}$ matrices are generated as described above. If each delay-Doppler cell in these matrices was represented by 32 bit integer, a single matrix would require $N_{fd}*N_T*4$ bytes, where $N_{fd}$ is the number of column cells and $N_T$ is the number of row cells. Within these parameters, a five data bit coherent integration requires 12.5 MB of storage memory. Storing all the matrices in the plurality of matrices requires 200 MB of memory. Straightforward incoherent integration requires M generations of a plurality of coherent integration matrices, where M corresponds to the number of incoherent integrations performed in the integration period. This amount of storage cannot be practically achieved. The method described above that uses the incoherent matrix formed by the cell-wise maximum operation does not require storage of each plurality of the coherent matrices, but rather initializes and then updates the incoherent integration as each plurality is formed and used for the coherent integration.

Figure 10:
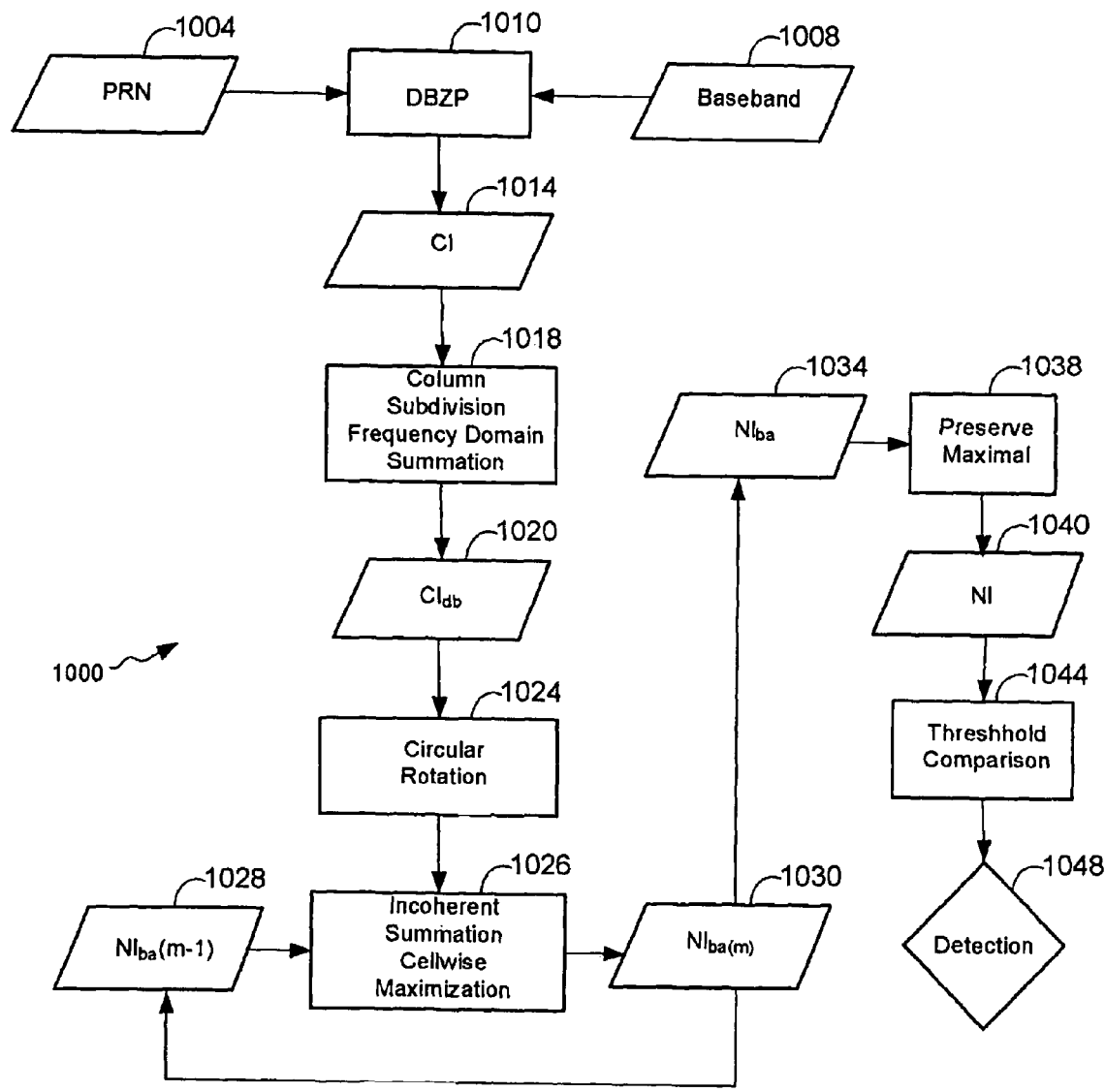
FIG. 10 depicts a process for detecting a GPS satellite signal.

These more computationally efficient methods are used in the signal detection process shown in FIG. 10. The code replica signal 1004 for the satellite being sought and the received GPS base band signal 1008 are processed by the DBZP method described above to form a coherent integration matrix 1014 having the column vectors 814. These vectors are divided and used to form zero padded vectors that are converted to the frequency domain (1018) to form a plurality of coherent integration matrices 1020. The various data bit combinations 1024 are generated and the incoherent integration (1024, 1028, and 1030) are computed as described above. From the resulting group of $N_{be}$ N $I_{be}$ matrices, each of size $N_{fd} \times N_T$, the one having the cell with the maximum power is selected 1038 and this matrix NI 1040 is compared to a threshold power 1044 to determine whether the satellite signal has been detected 1048. In response to the maximum power in one cell in the NI matrix exceeding the threshold power, the search process is stopped as the satellite PRN code used to generate the local signal has been detected. The code-delay and Doppler frequency corresponding to the cell in the matrix with the maximum power are recorded as estimates of the delay and Doppler of the detected satellite, which are then used to initiate tracking.

Figure 11:
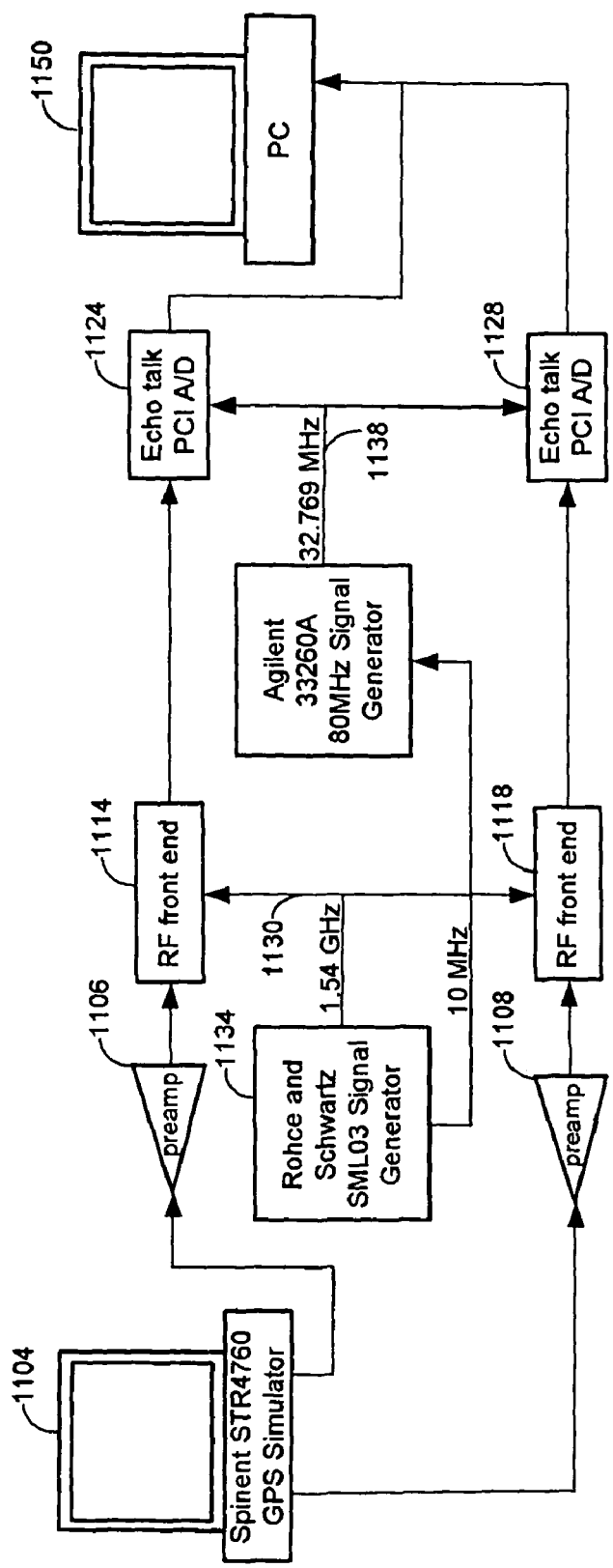
FIG. 11 depicts a system for simulating detection of a GPS satellite signal.

For satellites with various signal strengths, faster satellite signal acquisition is possible through the use of a variable threshold power that increases with the number of incoherent integrations until it reaches a limit or saturation at a predefined integration. The numerical values for the threshold are set with reference to the maximum cell values produced in response to the input signal only containing background noise rather than a signal with the PRN code of the desired satellite. One way in which the variable thresholds may be identified is through the calibration of the receiver hardware with the configuration 1100 shown in FIG. 11. A signal source 1104, such as a Spirent STR4760 GPS simulator, simulates a GPS signal that has gone through a passive antenna. The signal source 1104 has two outputs that deliver the simulated signal to two preamplifiers 1106 and 1108. The output of the preamplifiers are provided to RF front ends 1114 and 1118, respectively, and then fed to digital receivers 1124 and 1128, respectively. The preamplifiers may be Trimble amplifiers and the digital receivers may be EchoTek ECDR GC214-PCI/TS receiver cards. The 1.54 GHz LO signal 1130 for the RF front ends 1114 and 1118 and the 32.768 MHz board clock 1138 for the A/D converters in the digital receivers 1124 and 1128 are phase locked to a common 10 MHz reference 1140 from signal generator 1134. The signal generator may be a Rohde and Schwarz SML03 signal generator and the A/D bit depth generated by the receivers may be 16 bit signed values for both real and imaginary data and quantized to 6 bit signed values. The down mix and sampling configuration produces an Fif of 604 KHz. The digital signal processor operating on the computer includes programmed instructions that may be implemented with C++ objects.

The computationally efficient GPS signal detection process may be implemented by one or more digital signal processing integrated circuits. The integrated circuit may include the signal interface components that provide the signal from the antenna to the digital signal processor or the interface components may be provided externally of the integrated circuit. The integrated circuit includes a processor having memory in which programmed instructions are stored that configure the digital signal processor to implement the processes disclosed herein. The integrated circuit also includes volatile memory or an interface to volatile memory for the generation of the matrices manipulated by the digital signal processor.

Figure 12:
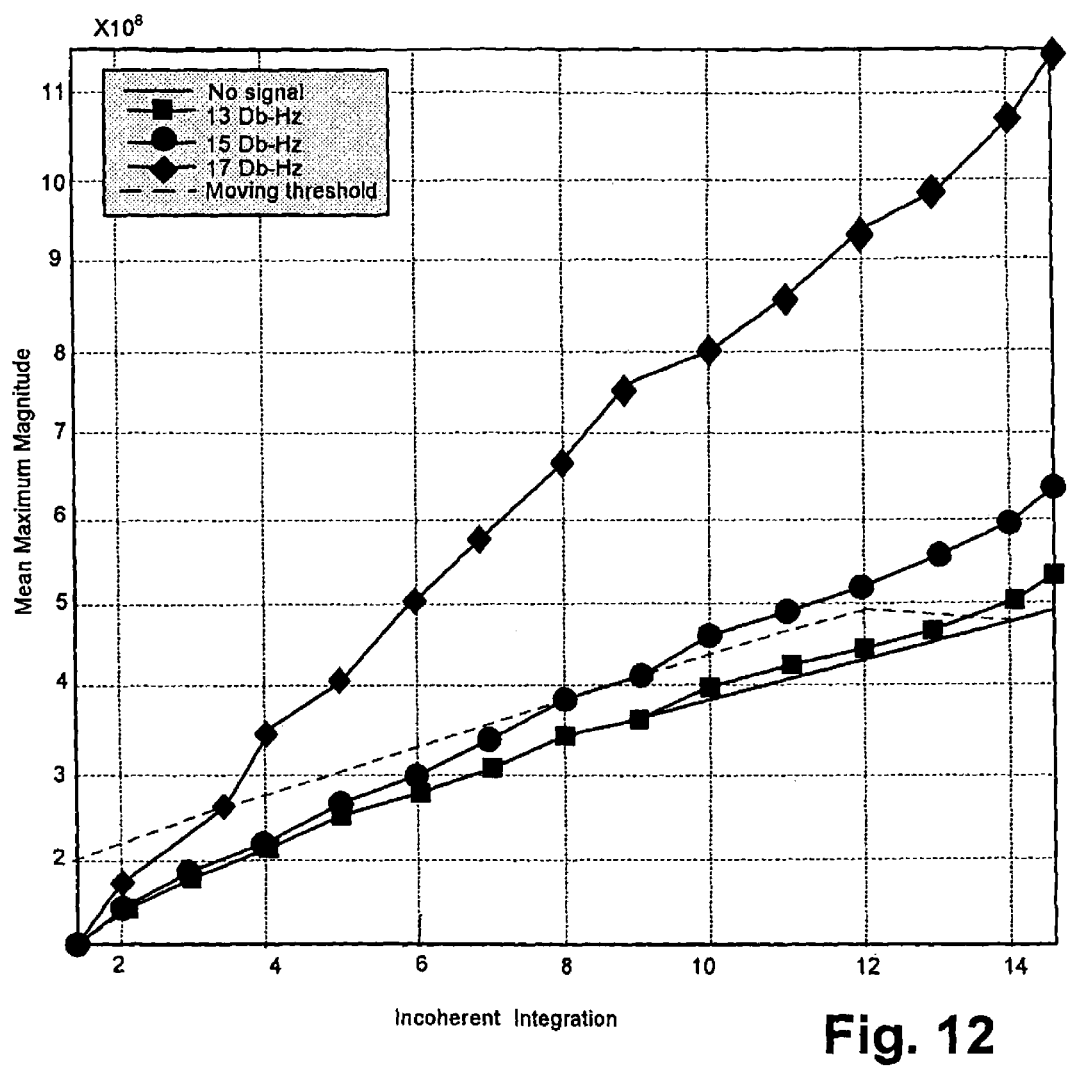
FIG. 12 is a graph of a variable threshold power that may be used to detect acquisition of a GPS satellite signal.
Figure 13:
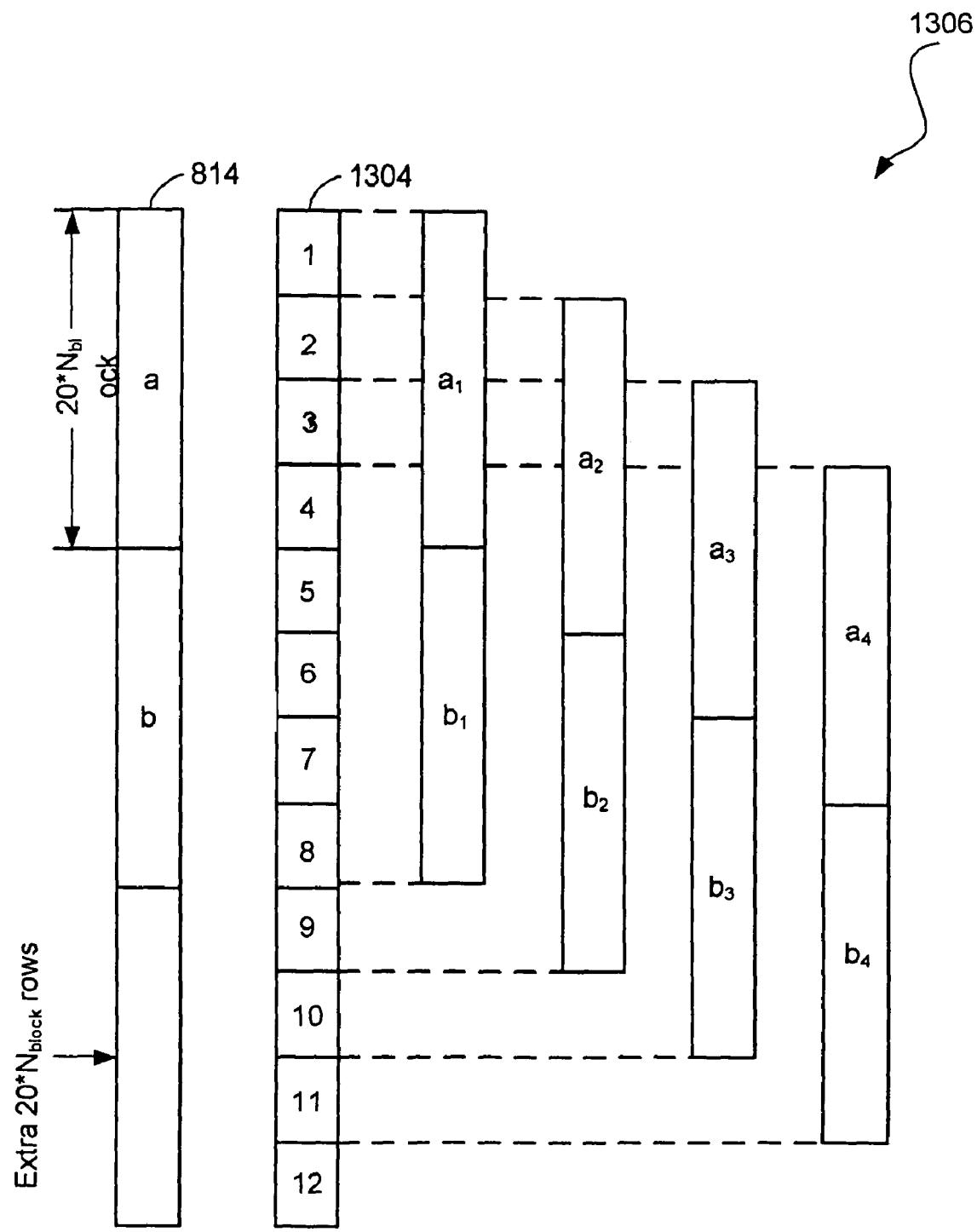
FIG. 13 depicts a subdivided column vector for bit edge detection.

The threshold power used by the digital signal processor may be varied to collect data from which the variable threshold may be empirically determined. For example, the processor may use a threshold for one inherent integration that equal to the average of the maximum noise power in a matrix cell plus one standard deviation of the noise power in a matrix cell at a later incoherent integration. The threshold may be increased in this manner until it reaches a predefined limit. FIG. 12 depicts a variable threshold power compared to the expected maximum cell values for satellites at different signal strengths. The no signal line represents the expected maximum cell value for a noise only signal.

Figure 14:
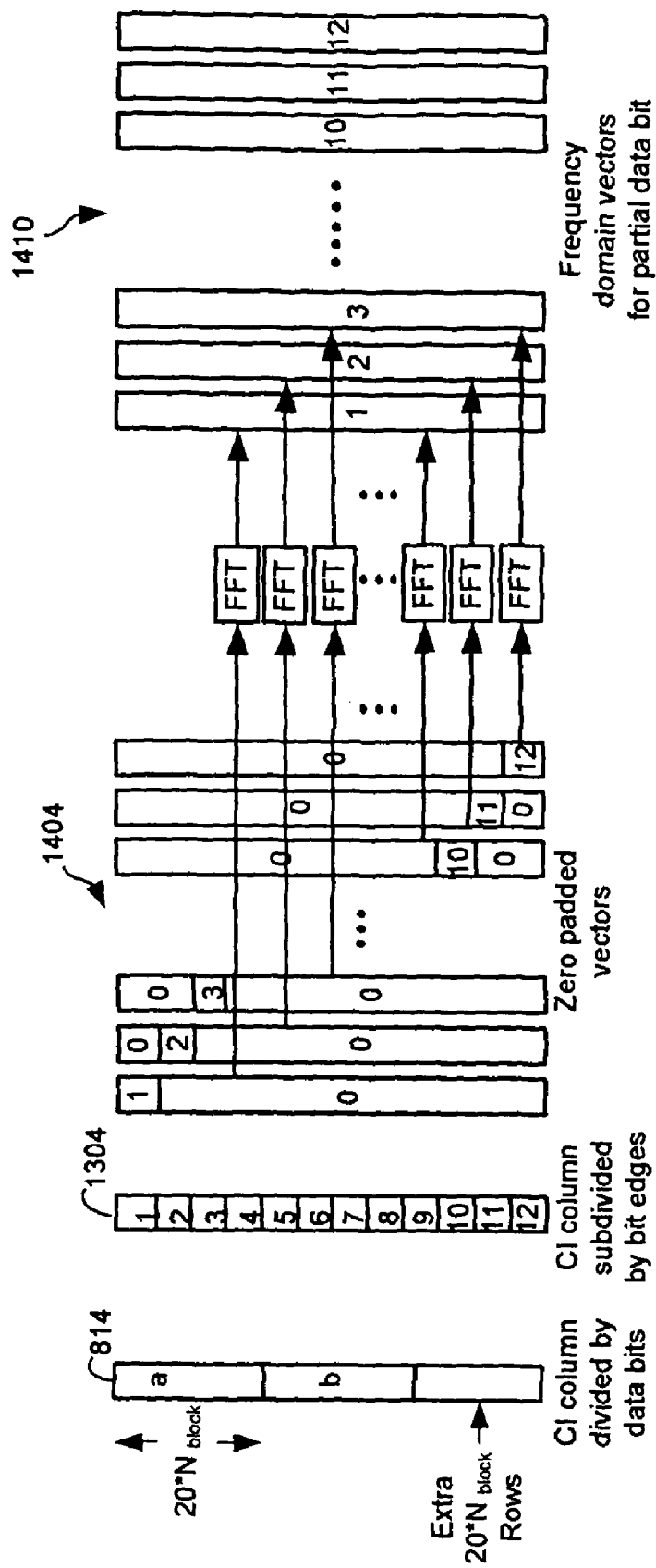
FIG. 14 depicts a process for generating frequency domain vectors for detecting bit edges.

Another computational advantage may be obtained for bit edge detection by enlarging the search space to cover possible data bit transitions. To enable coherent integration to test possible bit edge locations, the column dimension of each coherent matrix requires an extension that is equal to the number of coherent integration periods in an incoherent integration period times the number of blocks in the base band vector. In the example being discussed, each coherent integration period is 1 ms and the incoherent integration period is 20 ms. To generate an appropriate set of coherent integration matrices, column vector 814, which was previously described, is divided into $(N_{db+1})*N_{be}$ segments 1304. $N_{be}$ defines the number of bit edges for which the process searches. Various combinations of the data units in the vector 814 representing bit edge detections are depicted by the blocks 1306. As shown in FIG. 14, zero padded columns 14 are formed with each column segment and each zero padded column contains $N_{block}*(20/N_{be})$ non-zero cells and is $N_{fd}$ cells in length. The constant 20 arises from the inherent structure of the C/A code signal. Twenty cycles of the spreading code are present in one data bit. Although Doppler changes the duration of both the code period and the data bit, the ratio of the two parameters remains the same. The non-zero cells are filled with the values in the corresponding cells of the column vector 800 for the first $N_{db}*N_{be}$ zero padded columns. The remaining $N_{be}$ columns "wrap around" as illustrated in FIG. 14 for a two data bit coherent integration with $N_{be}$ equal to four. A FFT is performed on each of the zero padded columns to form the frequency domain vectors 1410 for bit edge detection.

To form the first column of the coherent integration matrix, the data bits for the $N_{be}$ frequency domain vectors 910 that correspond to the first bit edge are summed together. As shown in FIG. 10, the four column vectors corresponding to data unit a are 1, 2, 3, and 4. These vectors are added to form a frequency domain column A for a data bit. Columns are likewise formed for the remaining data units.

Figure 15:
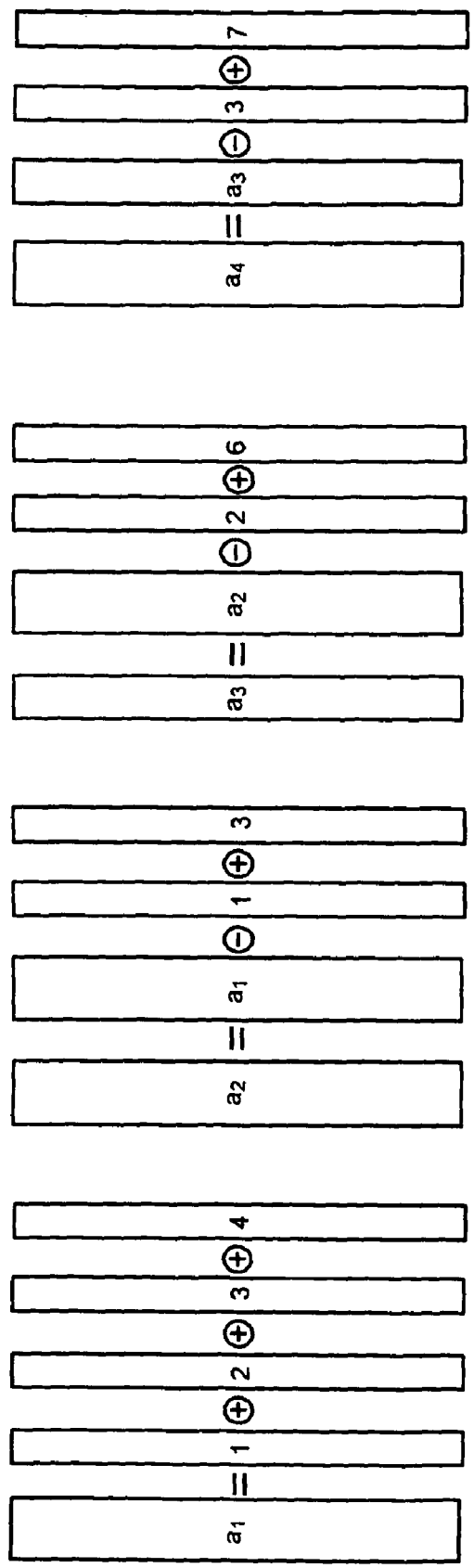
FIG. 15 depicts formation of sliding window computations used for bit edge detection.

After these frequency domain columns are formed, additional frequency domain columns are formed by sliding a window through the segmented time domain vector 904. As shown in FIG. 15, column a2 is formed by subtracting the first vector and adding the fifth vector from the column a1. Column a3 is similarly formed by subtracting the second vector and adding the sixth vector to column a2. In a similar manner, subsequent columns are computed to form additional frequency domain columns until the final set of frequency domain columns is formed. Thus, this process generates all $N_{be}$ frequency domain columns for each data bit. These columns are then combined according to all possible data bit polarities to generate the plurality of coherent integration matrices for the bit edge detection. This method forms $N_{be}*2^{N-1}$ coherent integration matrices. For each possible data bit edge, the incoherent integration method described above generates $N_{be}$ incoherent integration matrices. The matrix containing the cell having the maximum value identifies the position of the data bit edge.

Integration over long periods requires treatment of drift in the code signal. This drift is induced by the Doppler shift on the incoming signal and is typically referred to as code Doppler. The code Doppler causes the received acquisition code to shift with reference to the replica signal used for correlation. The code Doppler is directly proportional to the frequency Doppler according to the formula:

$$S_c = \frac{T_I F_D F_S}{L_I}.$$

The number of samples, $S_C$, by which the code phase drifts is a function of the integration period $T_I$, the frequency Doppler $F_D$, and the sampling rate $F_S$. The product of the three terms is normalized by the $L_I$ frequency, which is 1575.42 GHz.

Setting $S_C$ to 1 and inverting the equation to solve for $T_I$ yields the integration period that produces a shift of one sample. The maximum Doppler frequency for a ground based receiver is assumed to be ±5 KHz. The sampling frequency in a typical positioning satellite system is fixed at 2.048 MHz, and $L_I$ is equal to 1575.42 MHz. With these values, the integration period for a single sample is 0.1538 seconds. This time bounds the coherent integration period. A receiver with a higher sampling rate or more extreme dynamics, which results in frequency Doppler, need to take either the code drift into account by correlating against a C/A code to which the code Doppler has been applied, or by limiting the coherent integration period.

$T_I$ presents an upper bound on the coherent integration period. Coherent integration is accomplished in the DBZP method by performing the FFT on the matrix columns. In order to recover all of the signal power, the C/A code rollover point should remain in the same column in the coherent integration matrix. Fixing $T_I$, with respect to the dynamics and sampling rate, guarantees the code phase does not drift over multiple samples over the coherent integration period, which otherwise causes the signal power to be distributed over multiple delay bins. To acquire 15 db-Hz signals, the DBZP method requires total integration time of 1.5 seconds or more. Hence the incoherent integration method must properly compensate for the code Doppler.

The code Doppler may be mitigated by proper rotation of the coherent integration matrices before the incoherent integration and cell-wise maximization operations are performed. The rotation process is non-trivial, however. Each row of a coherent integration matrix represents a different Doppler frequency. Therefore, each row is circularly rotated by a different number of samples to compensate for code Doppler. The equation used for rotation is:

$$S_c[i] = \left\lfloor \frac{(mT_c)(F_D[i])F_S}{L_I} + 0.5 \right\rfloor.$$

The number of samples, $S_C$, to circularly rotate the row i is a function of the Doppler frequency represented by the row in the delay-Doppler matrix. The Doppler frequency is determined with reference to the Doppler range coverage, $F_{cov}$, and the Doppler bin resolution, $F_{res}$, in the following manner:

$$F_D[i] = \begin{cases} i \cdot F_{res} & i \leq N_{fd}/2 \\ i \cdot F_{res} - F_{cov} & i > N_{fd}/2 \end{cases}.$$

Proper circular rotation realigns the C/A code rollover to the same column of the coherent integration matrices and the incoherent matrices.

As noted above, the DBZP method described above uses a FFT for coherent integration. Because all of the columns on which the FFTs are performed are zero padded, additional computation efficiencies may be gained by using a zoom FFT. Zero padding a column adds no spectral information to the FFT output. A zoom FFT (ZFFT) minimizes the number of operations required to compute an FFT for a zero padded column by ignoring butterflies with zero inputs and computing partial butterflies for butterflies with partial input.

Figure 16:
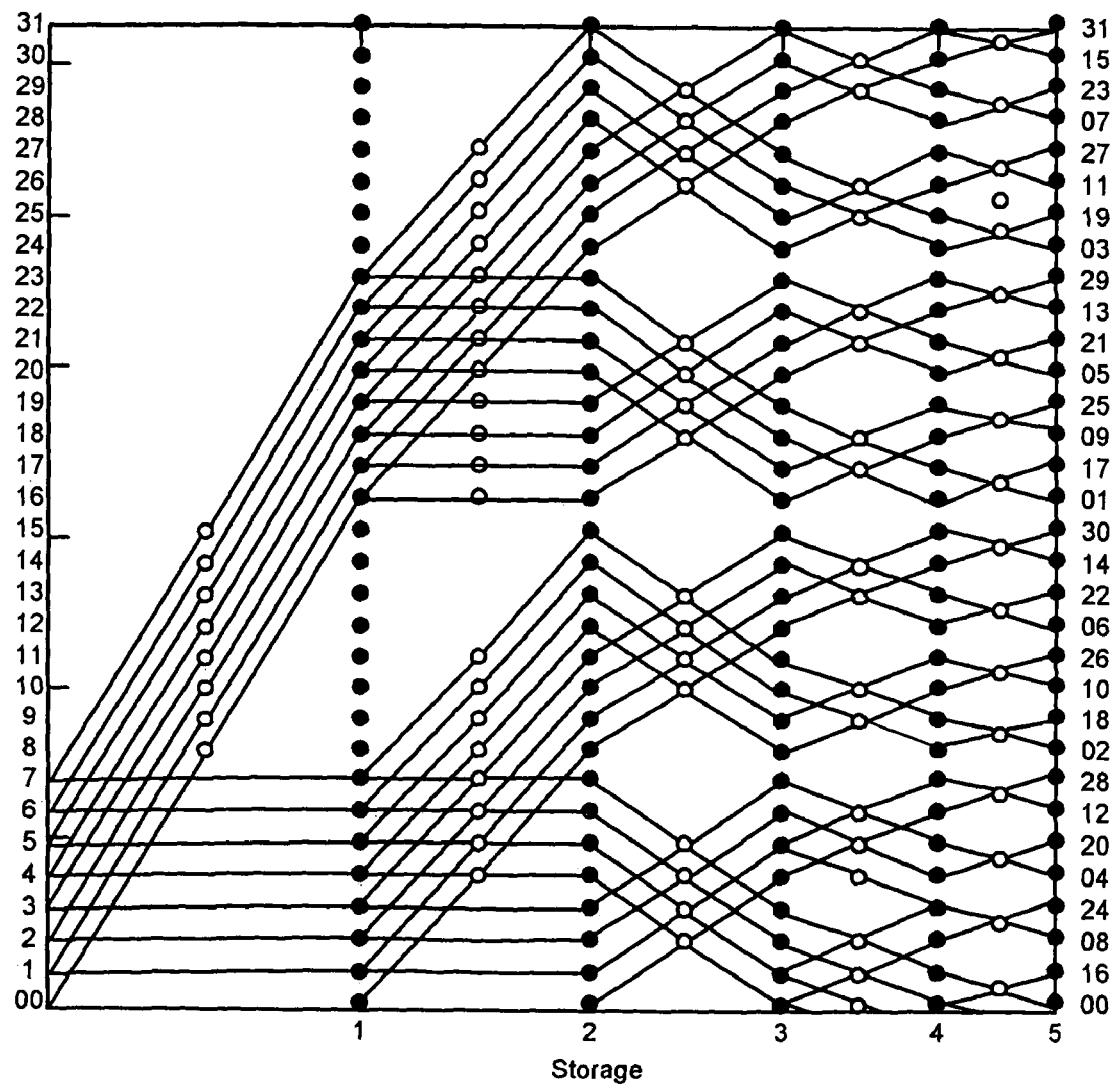
FIG. 16 depicts a representation of a zoom FFT that may be used for signal detection.

FIG. 16 provides an example of a radix-2 (r2) decimation in frequency (DIF) ZFFT operation. The butterfly diagram is analogous to the zero padded FFT operation required for each subdivided column in the data bit and bit edge search process described above. If input points 0-3 are non-zero cells of the zero padded column, the DIF FFT requires a natural order input vector and produces a digit reverse ordered output. The first two stages of the FFT require only partial r2 butterfly operations, along with the absence of complete butterflies. A normal 16 point FFT requires 32 multiplications and 64 additions, while the ZFFT shown in FIG. 11 only requires 28 multiplications and 44 additions. The following equation provides the number of additions and multiplications in an r2 ZFFT:

$$ZFFT_{additions} = P[\log_2(L) + 1] - L$$
$$ZFFT_{multiplications} = P\left[\frac{1}{2}\log_2(L) + 1\right] - L.$$

Given the total FFT length is P, the number of non-zero input (or bandwidth) points is denoted as L. A modified version of the r2 ZFFT may be applied to the FFT operation discussed above for generation of the coherent integration matrices. The twenty millisecond data bit period causes factors of five to appear in the prime factorization of $N_{fd}$. Additional prime factors may appear if $N_{db}$ is not a factor of 2 or 5. By preventing zeroed inputs into non r2 butterflies, the initial $\log_2(L)$ stages of the ZFFT include partial butterflies, after which the ZFFT is full scale and no longer includes zeroed points. By allowing non r2 butterflies only after the ZFFT has gone full scale, the computational savings from the partial butterflies are preserved.

Figure 17:
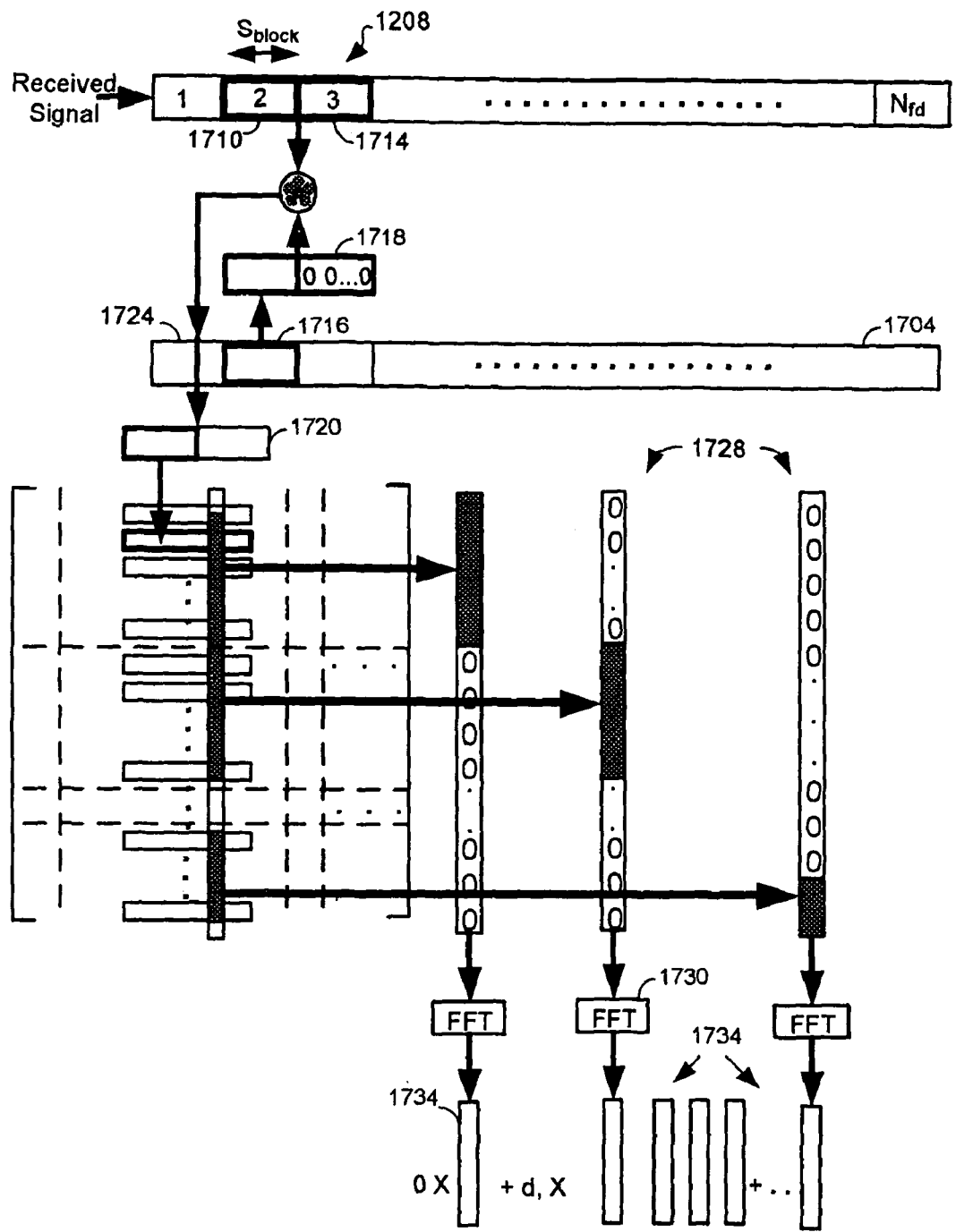
FIG. 17 is an illustration of a signal detection process that may be implemented by a digital signal processor.

An graphical overview of the computational efficient method implemented by a signal processor in a satellite signal receiver that detects a code signal in a received satellite signal is shown in FIG. 17. The received global positioning base band vector 1700 is segmented into $N_{fd}$ blocks, each of which is $S_{block}$ bits long. A replica code/acquisition signal 1704 is also divided into blocks, each of which is also $S_{block}$ bits long. A sample 1708 of the base band vector 1700 that is two blocks long, which are exemplified in FIG. 17 as blocks 1710 and 1714, is selected beginning at the $j^{th}$ block of the base band vector. The $i^{th}$ code block 1716 has a block 1718 of zero bits, which is $S_{block}$ bits long, appended to it. The zero padded code block and the base band sample are circularly correlated to generated a correlation value 1720. The first $S_{block}$ bits 1724 of the correlation value 1720 are inserted into the $j^{th}$ row of a matrix between columns $(i-1)*S_{block}$ and $i*S_{block}-1$. When all $N_{fd}$ blocks of the segmented base band vector have been circularly correlated with the code signal, the matrix rows are divided into blocks that are equal to the smallest increment corresponding to a bit edge and sorted into zero padded blocks 1728. The minimum increment is 1 ms. An FFT 1730 is applied to each of these zero padded blocks. The frequency domain columns 1234 are then summed in different combinations to test possible bit edge locations and bit values. The bit edge locations correspond to a starting column of a matrix multiplied by $d_1$ and the bit values are the value of $d_1$.

The above described embodiment and variants thereof are merely exemplary and those of ordinary skill in the art may readily devise their own implementations that incorporate the principles of the present invention and fall within the scope and spirit thereof.

We claim:

1. A method for use in a global positioning system (GPS) satellite signal receiver comprising:
    within the GPS satellite signal receiver,
        segmenting a sample of a received global positioning base band vector;
        segmenting a sample of a replica code/acquisition signal into segments corresponding in length to the segments of the base band vector;
        circularly correlating segments of the base band vector to zero padded segments of the code/acquisition signal to form a time domain correlation vector;
        inserting a portion of the time domain correlation vector in a matrix;
        continuing to correlate circularly the segments of the received signal sample with zero padded segments of the code signal sample until all of the segments in received signal sample have been circularly correlated;
        dividing rows in the matrix into blocks that are equal to a smallest increment corresponding to a bit edge;
        sorting the blocks from the divided rows into zero padded blocks;
        transforming the zero padded blocks into frequency domain columns;
        summing the frequency domain columns in different combinations to form a plurality of coherent integration matrices for testing possible bit edge locations and bit values; and
        indicating detection of a satellite signal based on further processing of the coherent integration matrices.

2. The method of claim 1, the zero padded block transformation further comprising:
applying a fast fourier transform to the zero padded blocks.

3. The method of claim 2, the application of the fast fourier transform being application of a zoom fast fourier transform (ZFFT) to the zero padded blocks.

4. The method of claim 3, the ZFFT being applied to the zero padded blocks is a radix-2 decimation in frequency (DIF) ZFFT.

5. The method of claim 4, the DIF ZFFT being applied to the zero padded blocks requires natural digit order vector input and produces reverse digit order output.

6. The method of claim 1 further comprising:
computing an incoherent integration following generation of the plurality of coherent integration matrices.

7. The method of claim 6, the incoherent integration computation further comprising:
adding an incoherent integration computed for a previous plurality of coherent integration matrices to a current plurality of coherent integration matrices; and
computing a cell wise maximization operation for all of the cells in the current plurality of coherent integration matrices.

8. The method of claim 7 further comprising:
comparing a cell wise maximum identified by the cell wise maximization computation for an incoherent integration to a threshold power; and
indicating a satellite signal is detected in response to the cell wise maximum exceeding the threshold power.

9. The method of claim 8 further comprising:
adjusting the threshold power in response to an incoherent integration being computed.

10. The method of claim 1 further comprising:
circularly rotating rows in the plurality of coherent integration matrices to adjust for code Doppler.

11. The method of claim 10, the circular rotation of the rows further comprising:
rotating each row in a coherent integration matrix by a different number of samples to compensate for code Doppler.

12. A system for detecting a global positioning system (GPS) satellite signal comprising:
an antenna configured to receive a GPS satellite signal;
a radio frequency (RF) front end coupled to the antenna, the radio frequency front end obtaining a base band signal from a GPS signal received from the antenna;
a digital receiver coupled to the RF front end for converting the base band signal to a digital base band signal; and
a digital signal processor configured to
segment a sample of a received global positioning base band vector;
segment a sample of a replica code/acquisition signal into segments corresponding in length to the segments of the base band vector;
circularly correlate segments of the base band vector to zero padded segments of the code/acquisition signal to form a time domain correlation vector;
insert a portion of the time domain correlation vector in a matrix;
continue to correlate circularly the segments of the received signal sample with zero padded segments of the code signal sample until all of the segments in received signal sample have been circularly correlated;
divide rows in the matrix into blocks that are equal to a smallest increment corresponding to a bit edge;
sort the blocks from the divided rows into zero padded blocks;
transform the zero padded blocks into frequency domain columns; and
sum the frequency domain columns in different combinations to form a plurality of coherent integration matrices for testing possible bit edge locations and bit values; and
indicate detection of a satellite signal based on further processing of the coherent integration matrices.

* * * * *